(12) United States Patent
Kippenberg et al.

(10) Patent No.: US 11,714,232 B2
(45) Date of Patent: Aug. 1, 2023

(54) OPTICAL COUPLING DEVICE

(71) Applicant: ECOLE POLYTECHNIQUE FEDERALE DE LAUSANNE (EPFL), Lausanne (CH)

(72) Inventors: Tobias Kippenberg, Aran (CH); John Jost, Lausanne (CH); Miles Anderson, Lausanne (CH); Junqiu Liu, Lausanne (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/982,469

(22) PCT Filed: Mar. 21, 2019

(86) PCT No.: PCT/IB2019/052300
§ 371 (c)(1),
(2) Date: Sep. 18, 2020

(87) PCT Pub. No.: WO2019/180655
PCT Pub. Date: Sep. 26, 2019

(65) Prior Publication Data
US 2021/0072459 A1 Mar. 11, 2021

Related U.S. Application Data

(60) Provisional application No. 62/645,927, filed on Mar. 21, 2018.

(51) Int. Cl.
G02B 6/293 (2006.01)
G02B 6/122 (2006.01)
G02B 6/12 (2006.01)

(52) U.S. Cl.
CPC ....... *G02B 6/1228* (2013.01); *G02B 6/29341* (2013.01); *G02B 2006/1204* (2013.01);
(Continued)

(58) Field of Classification Search
CPC .................. G02B 6/29341; G02B 2006/12083
See application file for complete search history.

(56) References Cited

U.S. PATENT DOCUMENTS 5,075,749 A * 12/1991 Chi ..................... H01L 31/0236
385/35
5,501,893 A 3/1996 Laermer et al.
(Continued)

FOREIGN PATENT DOCUMENTS

CN 102583215 A * 7/2012 ......... G02B 6/29335
CN 102778724 A * 11/2012 ......... G02B 6/29335
(Continued)

OTHER PUBLICATIONS

English translation of CN-105841725-A (Year: 2016).*
(Continued)

*Primary Examiner* — Charlie Y Peng
(74) *Attorney, Agent, or Firm* — Nixon & Vanderhye P.C.

(57) ABSTRACT

The present invention concerns an optical coupling device including at least one supporting layer comprising a first support wall and a second support wall. The at least one supporting layer comprises at least one bridging waveguide for coupling electromagnetic radiation to and from an optical resonator or optical device, the at least one bridging waveguide extending between the first support wall and the second support wall.

23 Claims, 15 Drawing Sheets

(52) U.S. Cl.
 CPC .............. *G02B 2006/12061* (2013.01); *G02B 2006/12147* (2013.01)

(56) References Cited

U.S. PATENT DOCUMENTS

| | | | |
|---|---|---|---|
| 5,682,401 | A | 10/1997 | Joannopoulos et al. |
| 6,127,273 | A | 10/2000 | Laermer et al. |
| 6,389,197 | B1* | 5/2002 | Iltchenko ................. G02B 6/10 372/9 |
| 6,798,947 | B2 | 9/2004 | Iltchenko |
| 6,859,582 | B2 | 2/2005 | Cai et al. |
| 7,035,509 | B2 | 4/2006 | Payne |
| 7,283,707 | B1 | 10/2007 | Maleki et al. |
| 8,682,115 | B2 | 3/2014 | Heidrich |
| 10,416,380 | B1* | 9/2019 | Chen ..................... G02B 6/1228 |
| 2005/0077513 | A1* | 4/2005 | Fan ..................... G02B 6/29341 257/45 |
| 2011/0255822 | A1 | 10/2011 | Zheng et al. |
| 2016/0202414 | A1* | 7/2016 | Englund .............. G02B 6/1225 264/1.24 |
| 2017/0293073 | A1* | 10/2017 | Chen ........................ G02B 6/30 |

FOREIGN PATENT DOCUMENTS

| | | | |
|---|---|---|---|
| CN | 103630966 A | * 3/2014 | |
| CN | 105841725 A | * 8/2016 | ............... G01D 5/38 |
| EP | 2228675 A1 | * 9/2010 | ......... G02B 6/29335 |

OTHER PUBLICATIONS

International Search Report for PCT/IB2019/052300 dated Jul. 9, 2019, 5 pages.
Written Opinion of the ISA for PCT/IB2019/052300 dated Jul. 9, 2019, 5 pages.
Alnis, J., et al., "Thermal-noise-limited crystalline whispering-gallery-mode resonator for laser stabilization", Physical Review A, vol. 84, 2011, pp. 011804-1-011804-4.
Aspelmeyer, Markus, et al., "Cavity optomechanics", Reviews of Modern Physics, vol. 86, No. 4, Oct.-Dec. 2014, pp. 1391-1452.
Braginsky, V. B., et al., "Experimental Observation of Fundamental Microwave Absorption in High-Quality Dielectric Crystals", Physics Letters A, vol. 120, No. 6, Mar. 2, 1987, pp. 300-305.
Brasch, V., et al., "Photonic chip-based optical frequency comb using soliton Cherenkov radiation", Science, vol. 351, Issue 6271, Jan. 22, 2016, pp. 357-360.
Brasch, Victor, et al., "Self-referenced photonic chip soliton Kerr frequency comb", Light: Science & Applications, vol. 6, No. 1, Jan. 2017, 6 pages.
Del'haye, P., et al., "Optical frequency comb generation from a monolithic microresonator", Nature, vol. 450, Dec. 20-27, 2007, pp. 1214-1217.
Del'haye, Pascal, et al., "Phase-coherent microwave-to-optical link with a self-referenced microcomb", Nature Photonics, vol. 10, No. 8, Aug. 2016, pp. 516-520.
Farnesi, D., et al., "Long period grating-based fiber coupler to whispering gallery mode resonators," Optics Letters, vol. 39, No. 22, Nov. 15, 2014, pp. 6525-6528.
Foster, Mark A., et al., "Silicon-based monolithic optical frequency comb source", Optics Express, vol. 19, No. 15, Jul. 18, 2011, pp. 14233-14239.
Gondarenko, Alexander, et al., "High confinement micron-scale silicon nitride high Q ring resonator", Optics Express, vol. 17, No. 14, Jul. 6, 2009, pp. 11366-11370.
Gorodetsky, M. L., et al., "High-Q optical whispering-gallery microresonators: precession approach for spherical mode analysis and emission patterns with prism couplers", Optics Communications, vol. 113, Dec. 15, 1994, pp. 133-143.
Gorodetsky, M. L., et al., "Optical microsphere resonators: optimal coupling to high-Q whispering-gallery modes", Journal of the Optical Society of America B, vol. 16, No. 1, Jan. 1999, pp. 147-154.

Hausmann, B. J. M., et al., "Diamond nonlinear photonics", Nature Photonics, vol. 8, May 2014, pp. 369-374.
Herr, T., et al., "Temporal solitons in optical microresonators", Nature Photonics, vol. 8, Feb. 2014, pp. 145-152.
Ilchenko, Vladimir S., et al., "Pigtailing the high-Q microsphere cavity: a simple fiber coupler for optical whispering-gallery modes", Optics Letters, vol. 24, No. 11, Jun. 1, 1999, pp. 723-725.
Jost, J. D., et al., "Counting the cycles of light using a self-referenced optical microresonator", Optica, vol. 2, No. 8, Aug. 2015, pp. 706-711.
Jung, Hojoong, et al., "Optical frequency comb generation from aluminum nitride microring resonator", Optics Letters, vol. 28, No. 15, Aug. 1, 2013, pp. 2810-2813.
Kippenberg, T. J., et al., "Microresonator-Based Optical Frequency Combs", Science, vol. 332, Apr. 29, 2011, pp. 555-559.
Knight, J. C., et al., "Phase-matched excitation of whispering-gallery-mode resonances by a fiber taper", Optics Letters, vol. 22, No. 15, Aug. 1, 1997, pp. 1129-1131.
Laine, J.-P., et al., "Microsphere Resonator Mode Characterization by Pedestal Anti-Resonant Reflecting Waveguide Coupler", IEEE Photonics Technology Letters, vol. 23, No. 8, Aug. 2000, pp. 1004-1006.
Levy, Jacob S., et al., "CMOS-compatible multiple-wavelength oscillator for on-chip optical interconnects", Nature Photonics, vol. 4, Jan. 2010, pp. 37-40.
Liang, W., et al., "High spectral purity Kerr frequency comb radio frequency photonic oscillator", Nature Communications, vol. 6, 2015, 8 pages.
Liang, W., et al., "Ultralow noise miniature external cavity semiconductor laser", Nature Communications, vol. 6, 2015, 6 pages.
Liang, Wei, et al., "Resonant microphotonic gyroscope", Optica, vol. 4, No. 1, Jan. 2017, pp. 114-117.
Liu, Guangyao, et al., "Low-loss prism-waveguide optical coupling for ultrahigh-Q low-index monolithic resonators", Optica, vol. 5, No. 2, Feb. 2018, pp. 219-226.
Marin-Palomo, Pablo, et al., "Microresonator-based solitons for massively parallel coherent optical communications". Nature, vol. 546, Jun. 8, 2017, 8 pages.
Mazzei, A., et al., "Optimization of prism coupling to high-Q modes in a microsphere resonator using a near-field probe", Optics Communications, vol. 250, No. 4, Jun. 2005, pp. 428-433.
Pan, Yong-Le, et al., "Highly efficient prism coupling to whispering gallery modes of a square μ cavity", Applied Physics Letters, vol. 82, No. 4, Jan. 27, 2003, pp. 487-489.
Papp, Scott B., et al., "Microresonator frequency comb optical clock", Optica, vol. 1, No. 1, Jul. 2014, pp. 10-14.
Peccianti, M., et al., "Demonstration of a stable ultrafast laser based on a nonlinear microcavity", Nature Communications, vol. 3, 2012, 6 pages.
Razzari, L., et al., "CMOS-compatible integrated optical hyper-parametric oscillator", Nature Photonics, vol. 4, Jan. 2010, pp. 41-45.
Savchenkov, Anatoliy A., et al., "Optical resonators with ten million finesse", Optics Express, vol. 15, No. 11, May 28, 2007, pp. 6768-6773.
Savchenkov, Anatoliy A., et al., "Tunable Optical Frequency Comb with a Crystalline Whispering Gallery Mode Resonator", Physical Review Letters, vol. 101, Aug. 29, 2008, pp. 093902-1-093902-4.
Savchenkov, Anatoliy A., et al., "Polymer Waveguide Couplers for Fluorite Microresonators", IEEE Photonics Technology Letters, 2017, 4 pages.
Soltani, Mohammad, et al., "Ultrahigh Q whispering gallery mode electro-optic resonators on a silicon photonic chip", Optics Letters, vol. 41, No. 18, Sep. 15, 2016, pp. 4375-4378.
Spillane, S. M., et al., "Ideality in a Fiber-Taper-Coupled Microresonator System for Application to Cavity Quantum Electrodynamics", Physical Review Letters, vol. 91, No. 4, Jul. 25, 2003, pp. 043902-1-043902-4.
Suh, Myoung-Gyun, et al., "Soliton microcomb range measurement", Science, vol. 359, Feb. 23, 2018, 4 pages.
Vollmer, Frank, et al., "Whispering-gallery-mode biosensing: label-free detection down to single molecules", Nature Methods, vol. 5, No. 7, Jul. 2008, pp. 591-596.

(56) References Cited

OTHER PUBLICATIONS

Williams, Kirt R., et al., "Etch Rates for Micromachining Processing—Part II", Journal of Microeletromechanical Systems, vol. 12, No. 6, Dec. 2003, pp. 761-778.
Xuan, Yi, et al., "High-Q silicon nitride microresonators exhibiting low-power frequency comb initiation", Optica, vol. 3, No. 11, Nov. 2016, pp. 1171-1180.
Xue, Xiaoxiao, et al., "Mode-locked dark pulse Kerr combs in normal-dispersion microresonators", Nature Photonics, vol. 9, No. 9, Sep. 2015, 8 pages.
Yang, Ki Youl, et al., "Bridging ultrahigh-Q devices and photonic circuits", Nature Photonics, vol. 12, May 2018, 7 pages.

\* cited by examiner

OPTICAL COUPLING DEVICE

This application is the U.S. national phase of International Application No. PCT/IB2019/052300 filed Mar. 21, 2019 which designated the U.S. and claims priority to U.S. Provisional Application No. 62/645,927 filed Mar. 21, 2019, the entire contents of each of which are hereby incorporated by reference.

FIELD OF THE INVENTION

The present disclosure relates to an optical coupling device or a photonic chip or photonic device. The present disclosure relates in particular to an optical coupling device or a photonic chip device for coupling light to and from an optical micro-resonator.

BACKGROUND

Crystalline microresonators are one of the best optical microresonator (OM) platforms demonstrated to date. This comes in part from their exceptionally high-quality factors and large transparency windows, demonstrating the highest optical quality factors ever measured ($10^{11}$) [1].

However, one of the main challenges to broad adoption of this platform is the difficultly in coupling light in and out of the optical microresonator (OM). Coupling using tapered optical fibers, prism coupling, and angled cleaved fibers has been demonstrated. Of these techniques tapered optical fibers allow for the highest flexibility allowing ideal coupling. However, these methods require complex optical packaging techniques.

Optical microresonators (OM) as a photonic platform have seen a dramatic increase in interest. The field began with the study of microspheres for probing quantum mechanical effects [2], but has expanded to cover a wide range of topics from fundamental quantum mechanics to telecommunication [3]. They have been widely used in the field of cavity optomechanics [4], and the sensitive evanescent nature of the optical resonator modes allows for evanescent field based biological sensing down to the single molecule level [5]. The discovery of Kerr based optical frequency combs [6] and soliton generation [7] has driven a renewed interest in the field, enabling a range of new applications based on parametric generation: terabyte communication [8], dark soliton formation [1], low noise microwave generation [10], range-finding [11], optical atomic clocks [12], generation of Cherenkov radiation [13], and optical frequency metrology [14]-[16].

In recent years OM based frequency combs have been demonstrated in a number of platforms: crystalline materials [17], fused silica microtoroids [6], photonic chips (based on silicon nitride [18] [19], aluminum nitride [20], Hydex [21] [22], and diamond [23]). Some of which, like the photonic chip based systems have shown great advances in their capabilities and are well suited for compact integration. Crystalline optical microresonators (COM) from fluoride crystals have exceptionally broad transparency windows and have demonstrated the highest optical finesses ($F=10^7$) to date [1]. They have been an integral platform in the development of optical microresonator based frequency combs having been used for the first demonstration soliton based Kerr optical frequency combs [7] and the first self-referenced of optical microresonator based comb [14]. In addition, this platform has been used to implement a range of applications such as optical gyroscopes [24], optical low-noise microwave generation [10], narrow linewidth lasers [25], optical reference cavities [26].

FIG. 3 shows a crystalline microresonator coupled to a photonic integrated chip with fiber input and output coupling.

A challenge to wide scale implementation of crystalline optical microresonators is integration with an optical coupling mechanism. To couple into the mode of an OM resonator the propagation constant of light in the coupling mechanism must be well matched to the propagation constant of mode in the OM, and is typically accomplished with evanescent field couplers. A wide range of evanescent field coupling devices have been implemented: prisms [27], angle cleaved fibers [28], tapered optical fibers [29], grating based fiber couplers [30], and photonic chip optical waveguides. The aforementioned references are published in the scientific literature. There does exist in the patent literature some patents related to coupling to microresonators, see references [31]-[34] below.

Fluoride crystalline optical microresonators are more challenging to couple to than traditional fused silica OMs due the low index of refraction of such materials (n<1.5). Tapered optical fibers are the most common way of coupling crystalline optical microresonator, supporting single-mode operation and filtering out higher-order modes while providing a gradient in propagation constant along the length of the taper. Although the taper coupling element is convenient and widely used, it does not provide sufficient rigidity and is sensitive to acoustic noise. At the moment fiber tapers provide the greatest efficiency in coupling to OMs, exceeding 99% and showing near perfect ideality [35].

Prism coupling is another way to couple to COMs, although this method does not allow for the most efficient coupling [36] [37]. In this method the laser is focused on the inner facet of the prism with an angle greater than the angle of total internal reflection, which allows the effective index to be varied as the angle is changed. One important requirement for prism coupling is the condition that the ratio of the refractive indices of the resonator and the prism is greater than unity. The phase-matching condition is fulfilled when the tangential components of the field in the prism and the resonator are equal. To date the maximum coupling efficiency that has been achieved with prism coupling is 75% [38].

A compact coupling element, the photon optical waveguide, has appeared recently. This is a clear route to integrating a range of OM platforms with photonic chips, and these systems have shown much promise for efficient coupling of high-quality factor (Q) OMs. Resonators made from $SiO_2$ with Q ~$10^8$ and coupling efficiencies of >90% have been demonstrated with $SiO_2$—Si—$SiO_2$ [39] and $Si_3N_4$ [40] waveguides. Also, good coupling was obtained between a $LiTaO_3$ OM with and a silicon waveguide with an efficiency of ~90% and a Q ~$10^8$ [41]. For the important class of crystalline optical microresonator made from fluoride materials, 80% coupling efficiency and Q ~$10^8$ has been demonstrated in a $CaF_2$ resonator with a polymer waveguide [42], although this material is not typically compatible with high optical powers.

SUMMARY

It is a goal of the present disclosure to provide an optical coupling device or a photonic chip device assuring improved light coupling in and out of an optical microresonator (OM).

The present disclosure thus relates to an optical coupling device. The optical coupling device includes at least one supporting layer comprising a first support wall and a second support wall. The at least one supporting layer comprises at least one bridging waveguide for coupling electromagnetic radiation to and from an optical resonator or optical device, the at least one bridging waveguide extending between the first support wall and the second support wall.

Other advantageous features can be found in the dependent claims.

While one promising route to coupling is leveraging microfabrication techniques to create optical waveguides to evanescently couple to crystalline microresonators, the inventors go one step further, and have developed a waveguide architecture that emulates a tapered optical fiber on a chip, and have successfully demonstrated close to critical coupling with a quality factor of $10^8$.

Such a device can be used, for example, to couple a wide array of fluoride crystalline materials, allowing for compact and robust optical packaging of the microresonator greatly simplifying the system. In addition, coupled optical microresonators are used to injection lock a butt-coupled laser diode.

An optical coupling device or photonic chip device is used to couple light to and from an optical microresonator (OM). The photonic chip has for example input and output optical waveguides that carry light through the chip. These waveguides deliver light to and collect light from a particular waveguide section that enables efficient coupling to an optical microresonator. This waveguide section allows for a large evanescent field with an effective index of refraction enabling the efficient coupling of (laser) light to from an optical microresonator.

The present disclosure relates to the provision of a novel photonic chip based optical coupler for optical microresonators. By providing a novel suspended bridge structure on, for example, a photonic chip, a new type of optical microresonator coupling device is provided.

The inventors have developed a simple yet innovative way to emulate a tapered optical fiber on a photonic integrated circuit that allows for efficient coupling to a wide range of OMs, including the fluoride crystals. This is accomplished by providing a bridge like coupling section on, for example, a photonic chip. The bridge structure acts as an optical waveguide that is suitable for and allows evanescent field coupling. The coupling section is held, for example, on two sides and preferably surrounded by a lower index medium on all other sides. It is possible for a higher index material to be below the bridge section. Light can be coupled to the special coupling section either via optical waveguides incorporated into the photonic chip or by directly focusing a free space beam into the bridge region.

The device of the present disclosure aims to provide the benefits of tapered optical fibers without the drawbacks.

For example, a $Si_3N_4$ waveguide can be used to couple into, for example, a thin $SiO_2$ optical waveguide. The $SiO_2$ optical waveguide dimensions are chosen to provide an effective index of refraction allowing, for example, for efficient coupling of high Q strontium fluoride ($SrF_2$) and barium fluoride ($BaF_2$) OMs.

Using $Si_3N_4$ integrated optical waveguides, light is coupled to a beam of $SiO_2$. The size or dimensions of the beam determines the effective index of refraction. As the beam gets smaller the evanescent

| Fluoride Materials Indices of Refraction | | | |
|---|---|---|---|
| Magnesium Fluoride | Calcium Fluoride | Strontium Fluoride | Barium Fluoride |
| 1.37 | 1.425 | 1.43 | 1.466 | field gets larger and the effective index refraction decreases, enabling a wide array of microresonators to be coupled.

BRIEF DESCRIPTION OF THE DRAWINGS

The above object, features and other advantages of the present invention will be best understood from the following detailed description in conjunction with the accompanying drawings, in which:

FIG. 6a shows a $SrF_2$ resonator close at close to critical coupling, and the inset shows the same resonance with 15 MHz calibration sidebands. FIG. 6b shows a measurement of the transmission versus linewidth as the vertical distance of the resonator is varied with respect to the waveguide. FIG. 6c the maximal coupling of a $BaF_2$ Resonator with the inset showing the calibration trace with 12 MHz sidebands. FIG. 6d shows the transmission versus linewidth for the $BaF_2$ resonator as the height is varied.

Herein, identical reference numerals are used, where possible, to designate identical elements that are common to the Figures.

DETAILED DESCRIPTION OF SEVERAL EMBODIMENTS

Figure 1:
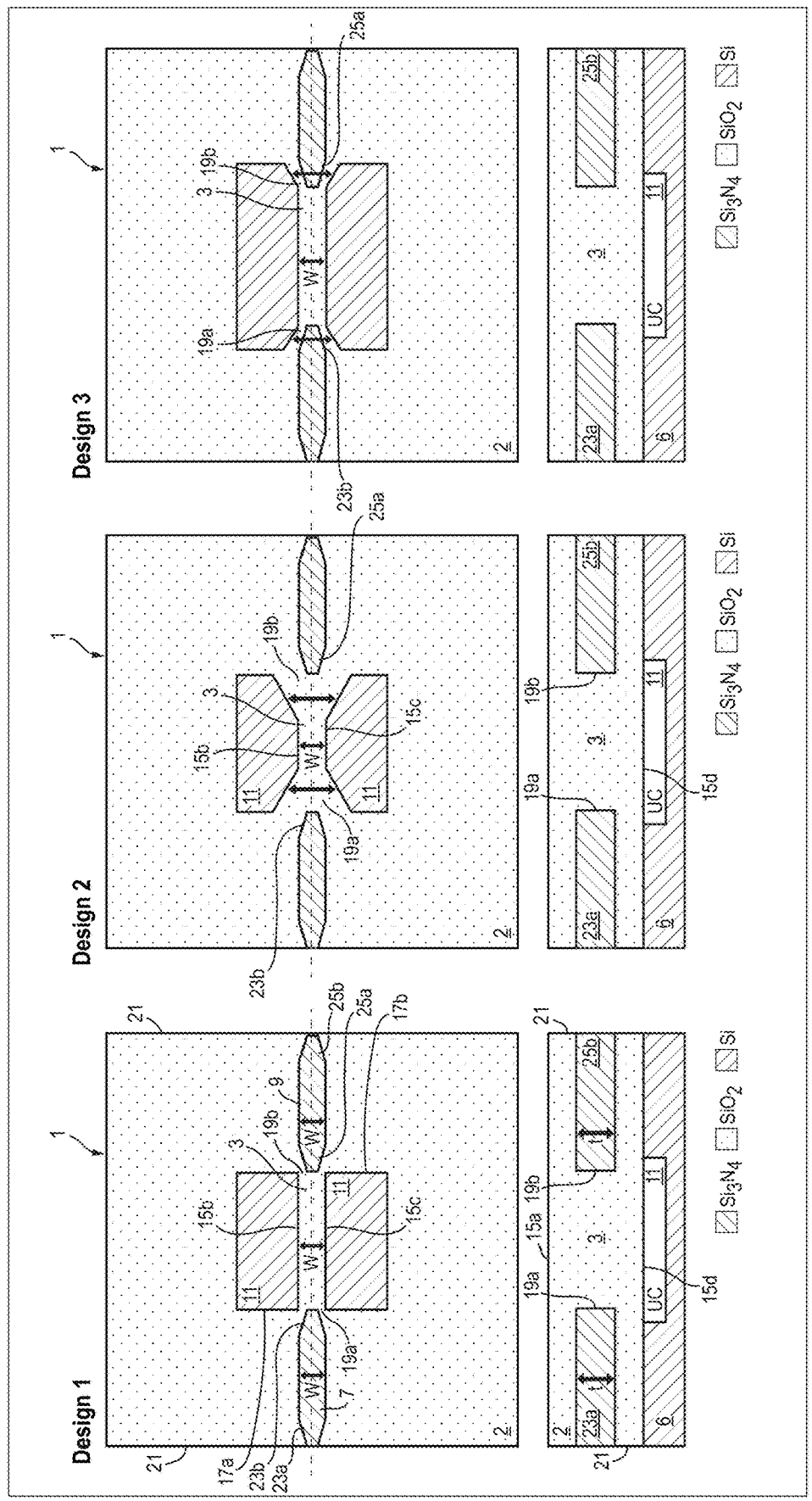
FIG. 1 shows different exemplary embodiments for an optical coupling device according to the present disclosure, where Design 1 has a fixed beam width which gives a fixed effective index of refraction, Design 2 has a tapered beam giving a gradient in the effective index of refraction, and in Design 3 the beam width is also fixed. The region around the taper section that couples to the bridge is varied. The materials indicated in this Figure are provided as exemplary materials. The lower illustrations in FIG. 1 are cross-sectional illustrations of the upper figures taken along the dashed line.

Exemplary embodiments of an optical coupling device 1 according to the present disclosure are shown in FIGS. 1, 2, 5, 10, 11, 12A, 12B, 13A, 13B, 14A and 14B.

The optical coupling device 1 includes at least one support layer, substrate or body 2 comprising at least one bridging waveguide 3 for coupling electromagnetic radiation to and/or from at least one optical resonator 5 or at least one optical device 5.

The optical coupling device 1 may include one or more additional layers, substrates or bodies 6 preferably under the support layer, substrate or body 2. The additional layer, substrate or body 6 can be in direct contact with the support layer, substrate or body 2. The additional layer, substrate or body 6 can be fully or partially in direct contact with the support layer, substrate or body 2.

The optical coupling device 1 and the support layer 2 includes at least one recess or trench structure 11. The recess or trench structure 11 defines a space or area around the bridging waveguide 3 having a refractive index lower to that of the constituent material of the bridging waveguide 3.

The bridging waveguide 3 is defined or delimited by the recess or trench structure 11. The recess or trench structure 11 may partially or fully surround the bridging waveguide 3.

The recess or trench structure 11 may extend partially or fully through the support layer 2. The recess or trench structure 11 may additionally extend into the additional layer 6. The recess or trench structure 11 may extend into the additional layer 6 and under the support layer 2.

The recess or trench structure 11 delimits or defines at least one or a plurality of sides or walls 15 of the bridging waveguide 3. The recess or trench structure 11 may partially or fully surround the one or the plurality of sides or walls 15 of the bridging waveguide 3.

The sides or walls 15 of the bridging waveguide 3 extend in direction parallel to a propagation or guiding direction of the electromagnetic radiation by the bridging waveguide 3.

Figure 2:
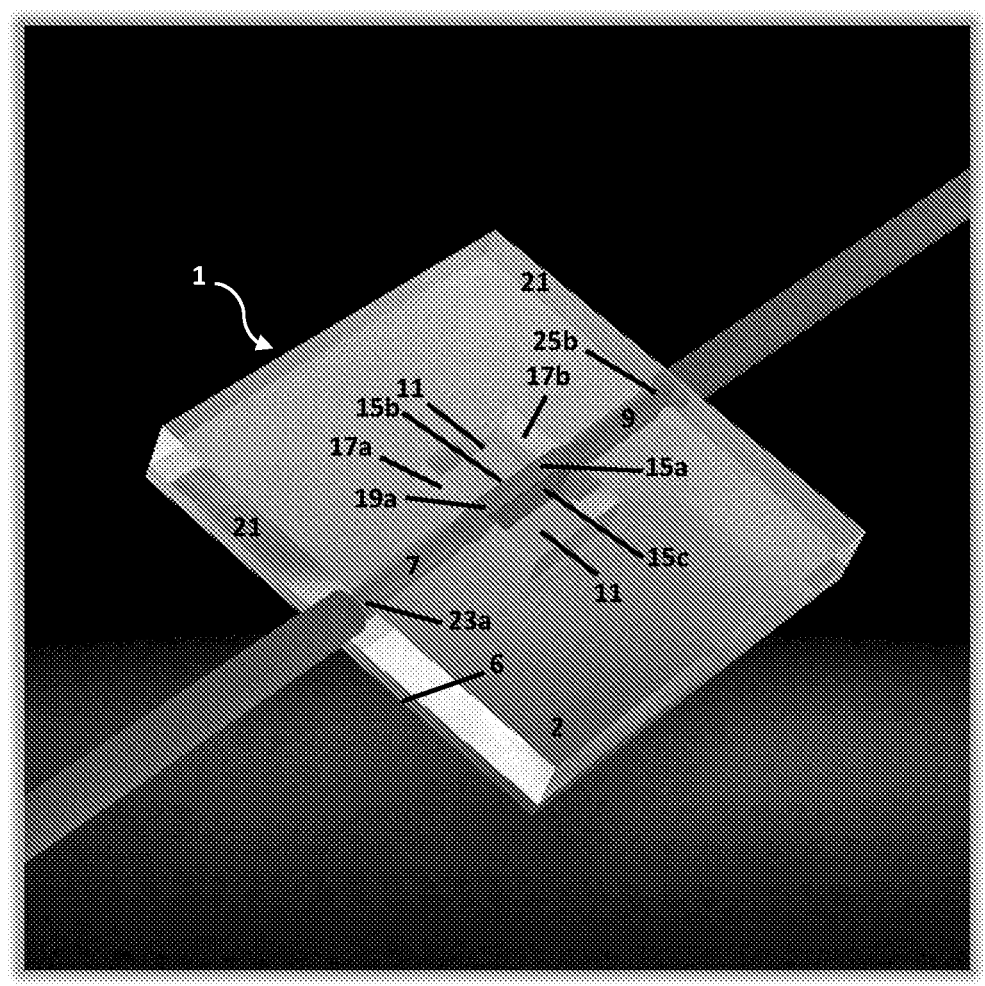
FIG. 2 is a rendered view of an optical coupling device on a chip to which a laser beam is shown entering and exiting.
Figure 3:
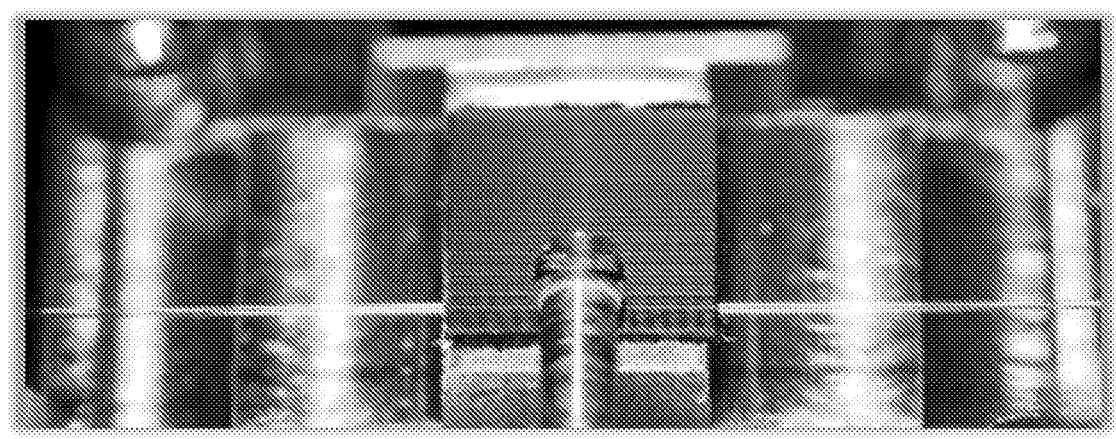
FIG. 3 shows a crystalline microresonator coupled to a photonic integrated chip with fiber input and output coupling.

For example, the recess or trench structure 11 can delimit (or surround) a first side wall 15b, a second side wall 15c and a lower wall (defined by undercut UC) 15d to define a (substantially) rectangular shaped bridging waveguide 3 (see, for example, FIG. 2). The recess or trench structure 11 surrounds the first side wall 15b, the second side wall 15c and the lower wall 15d. An upper wall 15a is defined by an outer surface of the supporting layer 2 (the outer surfaced in contact with the surrounding environment, for example, air). This provides a (substantially) rectangular shaped (in cross-section) bridging waveguide 3 (see, for example, FIG. 2).

A waveguide portion 3 on the photonic chip 1 that has is surrounded by, for example, air on all 4 sides is thus provided. In the absence of the undercut UC, a waveguide portion 3 on the photonic chip 1 that has is surrounded by, for example, air on 3 sides is thus provided.

In the absence of the undercut UC, the device 1 may include a support base or pedestal in contact with and supporting the lower wall 15d or a floor 15d of the bridging waveguide 3.

The upper wall 15a can define fully or partially by the outer surface of the optical coupling device and the supporting layer 2. Alternatively, this upper wall 15a may be fully defined by the recess or trench structure 11 and, in such a case, the bridging waveguide 3 is located fully inside the supporting layer 2.

The upper wall 15a, for example, can contact or be positioned in proximity to an optical resonator 5 or an optical device 5 for coupling electromagnetic radiation to and/or from the optical resonator 5 or the optical device 5.

The bridging waveguide 3 may be of any shape or geometry and is not limited to the above-mentioned rectangular form (cross-sectional shape). The bridging waveguide 3 may contain one single wall 15 and define a cylindrical shape or may comprise a plurality of interlinked walls defining a desired shape of the bridging waveguide 3.

The recess or trench structure 11 may partially or fully surround at least one wall 15, a plurality of the walls 15 or all the walls 15 of the bridging waveguide 3. The recess or trench structure 11 may fully surround all the sides or walls 15 of the bridging waveguide 3 except an upper side or wall 15a. The upper side or wall 15a may be fully or partially defined be an outer surface of the support layer 2. When partially defined by the outer surface of the supporting layer 2, the recess or trench structure 11 may partially surround the upper side or wall 15a.

The optical coupling device 1 includes a first support interface or wall 17a and a second support interface or wall 17b in the supporting layer 2.

The bridging waveguide 3 extends inside the supporting layer 2 between the first support wall 17a and the second support wall 17b. The bridging waveguide 3 extends in a plane defined by the supporting layer 2.

The recess or trench structure 11 delimits or defines (or surrounds) the first support interface or wall 17a and the second support interface or wall 17b inside the supporting layer 2.

The first support wall 17a and the second support wall 17b hold the bridging waveguide 3 in suspension or overhanging in the recess or trench structure 11.

The bridging waveguide 3 includes an input extremity 19a and an output extremity 19b. Electromagnetic radiation is inputted through the input extremity 19a, guided by the bridging waveguide 3 through to the output extremity 19b where the electromagnetic radiation exists the bridging waveguide 3.

The input extremity 19a and the output extremity 19b are (directly) connected to or with the first support interface or wall 17a and the second support interface or wall 17b respectively. The first support wall 17a and the second support wall 17b hold or support the bridging waveguide 3. The bridging waveguide 3 may be (partially or fully) suspended or over-hanging between the first support wall 17a and the second support wall 17b.

The bridging waveguide or bridge section 3 can thus be a beam, for example, a free-standing beam interconnecting opposite walls of the supporting layer 2 defined by recess or trench structure 11, such as the first and second support walls 17a, 17b.

The input extremity 19a and the output extremity 19b are preferably directly integrally connected to or formed with the first support interface or wall 17a and the second support interface or wall 17b. The input extremity 19a, the output extremity 19b and the first and second support walls 17a 17b are, for example, all realized in or consisting of the same material, for example, the same material of the supporting layer 2.

The bridging waveguide 3 defines an elongated waveguide bridging or interconnecting inner walls of the supporting layer 2. The bridging waveguide 3 may have a (substantially) uniform or constant cross-sectional profile in the elongated or propagation direction of the waveguide (FIG. 1, Design 1). Alternatively, bridging waveguide 3 may, for example, has a cross-sectional profile tapering outward at one or both the extremities 19a, 19b of the bridging waveguide 3. The extremities 19a, 19b of the bridging waveguide 3 taper outwards in a direction running from the center of the bridging waveguide 3 towards the extremities of the bridging waveguide 3 or towards the support interfaces or walls 17a, 17b (FIG. 1, Designs 2 and 3). Tapering may, for example, by confined to the end portions 19a, 19b or be present along more than 50%, or more than 75% of the length or extension of the bridging waveguide 3.

The bridge section 3 being tapered in width W allows for the effective index of refraction to vary along the length of the bridge section 3, which assures optimization of the coupling.

The width W extends in a plane defined by the optical coupling device 1 or the supporting layer 2 and perpendicular to the guiding direction or electromagnetic propagation direction of the bridging waveguide 3. The thickness t extends in a direction perpendicular to the plane defined by the optical coupling device 1 or the supporting layer 2 and perpendicular to the guiding direction or electromagnetic propagation direction of the bridging waveguide 3.

The optical coupling device 1 may further include at least one input optical waveguide 7 and/or at least one output optical waveguide 9. The bridging waveguide 3 is located between the at least one input optical waveguide 7 and the at least one output optical waveguide 9.

The supporting layer 2 includes the input optical waveguide 7 and the output optical waveguide 9. The input optical waveguide 7 and the output optical waveguide 9 are, for example, buried inside the supporting layer 2.

The input optical waveguide 7 and the output optical waveguide 9 extend between an external side or wall 21 of the optical coupling device 1 and the bridging waveguide 3.

The input optical waveguide 7 and the output optical waveguide 9 comprise or consist of a material having a higher refractive index than the supporting layer 2 and/or the bridging waveguide 3.

The input optical waveguide 7, the bridging waveguide 3 and the output optical waveguide 9 are, for example, aligned and extend through the optical coupling device 1 to permit optical coupling and propagation/guiding of electromagnetic radiation from the input optical waveguide 7 and through both the bridging waveguide 3 and the output optical waveguide 9 to outside the optical coupling device 1.

The input optical waveguide 7 includes an input end 23a and an output end 23b. The input end 23a receives electromagnetic radiation inputted to the optical coupling device 1 and the input optical waveguide 7 is configured to guide the inputted electromagnetic radiation to the output end 23b and to the bridging waveguide 3. The input end 23a may define an outer surface of the optical coupling device 1. However, this is not necessary and the input end 23 may be inside the device 1 (for example, inside the supporting layer 2) and the external side or wall 21 may define the outer surface of the optical coupling device 1. The output end 23b directly contacts the extremity 19a of the bridging waveguide 3 to couple electromagnetic radiation into the bridging waveguide 3. The input optical waveguide 7 is, for example, fully embedded in the supporting layer except for an interface defined by input end 23a defining an outer interface of the device 1.

The input end 23a and/or the output end 23b of the input optical waveguide 7 can be tapered. The input end 23a and/or the output end 23b can have a tapered cross-section that is tapered inwardly in a direction extending away from the center of the input optical waveguide 7 or towards the outer-most walls of the device 1 or the towards the bridging waveguide 3. The input end 23a and/or the output end 23b of the input optical waveguide 7 can alternatively be tapered outwardly or be non-tapered.

The output optical waveguide 9 includes an input end 25a and an output end 25b. The input end 25a receives electromagnetic radiation from the bridging waveguide 3 and is configured to guide the received electromagnetic radiation to the output end 25b and out of the device 1. The output end 25b defines an outer surface of the optical coupling device 1. The input end 25a directly contacts the extremity 19a of the bridging waveguide 3 to couple electromagnetic radiation from the bridging waveguide 3 into the output optical waveguide 9. The output optical waveguide 7 is, for example, fully embedded in the supporting layer except for an interface defined by output end 25b defining an outer interface of the device 1.

The input end 25a and/or the output end 25b of the output optical waveguide 9 can be tapered. The input end 25a and/or the output end 25b can have a tapered cross-section that is tapered inwardly in a direction extending away from the center of the output optical waveguide 9 or towards the outer-most walls of the device 1 or the towards the bridging waveguide 3. The input end 25a and/or the output end 25b of the output optical waveguide 9 can alternatively be tapered outwardly or be non-tapered.

The output end 23b of the input optical waveguide 7 and the input end 25a of the output optical waveguide 9 may (directly) contact the bridging waveguide 3 at the first and second support walls 17a, 17b respectively (see for example, FIG. 1 Designs 1 and 2) and/or at the extremities 19a, 19b of the bridging waveguide 3. Alternatively, the output end 23b of the input optical waveguide 7 and the input end 25a of the output optical waveguide 9 may extend into the bridging waveguide 3 and beyond the first and second support walls 17a, 17b.

The output end 23b of the input optical waveguide 7 and the input end 25a of the output optical waveguide 9 may, for example, extend into the tapered extremities 19a, 19b respectively of the bridging waveguide 3 (see for example, FIG. 1 Design 3).

The output end 23b of the input optical waveguide 7 and the input end 25a of the output optical waveguide 9 may, for example, extend into the tapered extremities 19a, 19b respectively to a non-tapered location in the bridging waveguide 3.

The tapered output end 23b can be for example enclosed by the first tapered end 19a of the bridging waveguide 3, and the tapered input end 25a can be enclosed by the second tapered end 19b of the at least one bridging waveguide (3).

The bridging waveguide 3 is thus supported by input optical waveguide 7 at one end and by the output optical waveguide 9 at an opposite end.

The input optical waveguide 7 and/or the output optical waveguide 9 are, for example, integrated or enclosed by the bridging waveguide material.

The optical coupling device 1 may include the substrate 6 and the layer 2 may define a coupling layer provided on the substrate. The input optical waveguide 7 and/or the output optical waveguide 9 are integrated or enclosed in the coupling layer, and the bridging waveguide 3 is defined in the coupling layer.

The bridging waveguide 3 may include a straight section as well as first and second tapered sections. The straight section comprises substantially straight or parallel side walls sandwiched between the first tapered section and the second tapered section. The first tapered section tapers inwards from the input optical waveguide 7 towards the straight section, and the second tapered section tapers outwards from the straight section to the output optical waveguide 9. The input optical waveguide 7 directly contacts the first tapered section and the output optical waveguide 9 directly contacts the second tapered section (see for example, FIG. 1 Design 2).

The bridging waveguide 3 may include a straight section as well as first and second tapered sections. The straight section comprises substantially straight or parallel side walls sandwiched between the first tapered section and the second tapered section. The first tapered section tapers inwards towards the straight section, and the second tapered section tapers outwards from the straight section. The straight section directly contacts and extends between the input optical waveguide 7 and the output optical waveguide 9 (see for example, FIG. 1 Design 3).

The bridging waveguide 3 is, for example, tapered in width or cross-section along a guiding direction of the bridging waveguide 3. The bridging waveguide 3 is, for example, tapered in width W or cross section along the guiding direction of the bridging waveguide 3 and has a linearly varying width W or cross-section.

The recess or trench structure 11 can, for example, delimit or partially surround the bridging waveguide 3 to expose between 40% or 50% or 65% and 99%; or between 85% and 99% of an outer surface area of the bridging waveguide 3 to the surrounding environment, for example, air.

The recess or trench structure 11 defines at least one wall 15 of the bridging waveguide 3. The at least one wall 15 can extend entirely or partially around the bridging waveguide 3.

The recess or trench structure 11 may define at least a first wall and a second wall of the bridging waveguide 3.

The recess or trench structure 11 may also define a floor 15d of the bridging waveguide 3. The optical coupling device 1 or the recess or trench structure 11 may include at least one undercut defining the floor 15d of the bridging waveguide 3. The at least one undercut may extend fully under the bridging waveguide 3 to define the floor 15d of the bridging waveguide 3.

At least one recess or trench structure 11 may, for example, include a first trench defining a first wall of the bridging waveguide 3 and a second trench defining a second wall of the bridging waveguide 3 and at least one undercut UC that may extend from the first or second trench to define the floor 15d of the bridging waveguide. The at least one undercut UC may extend fully from the first trench to the second trench to define the floor 15d of the bridging waveguide 3.

The recess or trench structure 11 may, for example, define a bridging waveguide 3 that is between 65% and 99% or between 85% and 99% surrounded by air, or fully surrounded by air.

The recess or trench structure 11 may define a bridging waveguide 3 that comprises a plurality of sides 15 and at least three sides or four sides 15 are surrounded by air. The recess or trench structure 11 may define a bridging waveguide 3 that is rectangular or square in cross-section, and at least three or four sides 15 thereof are surrounded by air. Alternatively, the recess or trench structure 11 may define a bridging waveguide 3 that is circular or oval in cross-section.

The recess or trench structure 11 defines, for example, a bridging waveguide 3 that is suspended or free-standing.

The recess or trench structure 11 may define, for example, a bridging waveguide 3 that is supported by the input optical waveguide 7 at a first end, and by the output optical waveguide 9 at a second end. A further support or mount may be located under the bridging waveguide 3 and contacting the bridging waveguide 3 to support the bridging waveguide 3.

The recess or trench structure 11 is, for example, partially or fully filled with a material having a lower refractive index than that of the bridging waveguide material 3.

The supporting layer 2 and/or the bridging waveguide 3 comprise or consists of a material having a lower refractive index than that of a material of the input optical waveguide 7 and the output optical waveguide 9.

The recess or trench structure 11 may contain a material having a refractive index that is less than or higher than the refractive index of the supporting layer 2 and/or the bridging waveguide 3 and/or the input optical waveguide 7 and the output optical waveguide 9.

The bridging waveguide 3 may comprise substantially straight or parallel side walls directly contacting and/or extending between the input optical waveguide 7 and the output optical waveguide 8.

In one exemplary embodiment, the supporting layer 2 and/or the bridging waveguide 3 comprises or consists solely of fused silica. The input optical waveguide 7 and/or the output optical waveguide 9 may comprise or consist solely of Silicon Nitride. The additional layer or substrate 6 may, for example, comprises or consists solely of Silicon. It is however noted that these materials are solely provided as exemplary materials and the device 1 of the present disclosure may be implemented using materials different to those mentioned above. The supporting layer 2 and/or the bridging waveguide 3 may, for example, comprises or consists solely of lithium niobite or lithium tantalite. The input optical waveguide 7 and/or the output optical waveguide 9 may, for example, comprise or consist solely of silicon, or aluminium nitride or alumnia or lithium niobite.

The input optical waveguide 7 and/or the output optical waveguide 9 can have a width W between 0.025 µm and 2 µm, and/or a thickness t between 0.025 µm and 2 µm. The input optical waveguide 7 and/or the output optical waveguide 9 is, for example, tapered linearly or non-linearly to a width W of between 0.05 µm and 0.4 µm. Tapering may alternatively be outwards to, for example, mode match into a laser. Tapering out may be, for example, to a width of 5 µm. The input optical waveguide 7 and/or the output optical waveguide 9 can have, for example, a length between 0.5 mm and 5 mm, for example 2.5 mm.

The bridging waveguide 3 has, for example, a width W between 1 µm and 5 µm or 6 µm, and/or a thickness between 1 µm and 6 µm, and/or a length between 10 µm and 100 µm.

The bridging waveguide 3 can have a width W less than 2.8 µm and greater than 1 µm.

The supporting layer 2 may, for example, have a height H of between 1 and 6 µm.

The undercut may, for example, have a depth of 0.1 to 20 µm.

The optical resonator 5 may comprise or consist solely of a crystalline or non-crystalline microresonator. The crystalline microresonator may, for example, comprise or consist solely of a fluoride crystalline material or an alkaline earth metal fluoride. The crystalline microresonator may, for example, comprise or consist solely of Magnesium Fluoride, Calcium Fluoride, Strontium Fluoride, Barium Fluoride, or Lithium Fluoride or Lithium Niobate or Lithium tantalite. The non-crystalline microresonator may comprise or consist solely of, for example, glass or fused silica $SiO_2$.

The optical coupling device 1 can further include a holding device configured to hold the optical resonator 5 in proximity to the bridging waveguide 3. The holding device may be, for example, a clamp or an adhesive (glue).

The optical coupling device 1 may be part of a photonic chip or may be a photonic chip. FIG. 1 shows different exemplary embodiments or designs of the optical coupling device 1.

Two different parameters were focused on in the design optimization process. The ability to control the effective index of refraction and the optimization of the overall transmission. One goal of the designs was to provide a free standing or approximately free-standing beam, for example, a free-standing or approximately free-standing beam of $SiO_2$.

FIG. 1 shows different exemplary Designs for emulating a taper on a chip. Design 1, for example, has a fixed beam or bridge width, which gives a fixed effective index of refraction. Design 2 has a tapered beam or bridge, giving a gradient in the effective index of refraction. In Design 3, the beam or bridge width is also fixed along a section but the region around the tapered section that couples to the fixed width section of the bridge 3 is varied.

FIG. 1 shows relevant portions of the three different designs.

Figure 10:
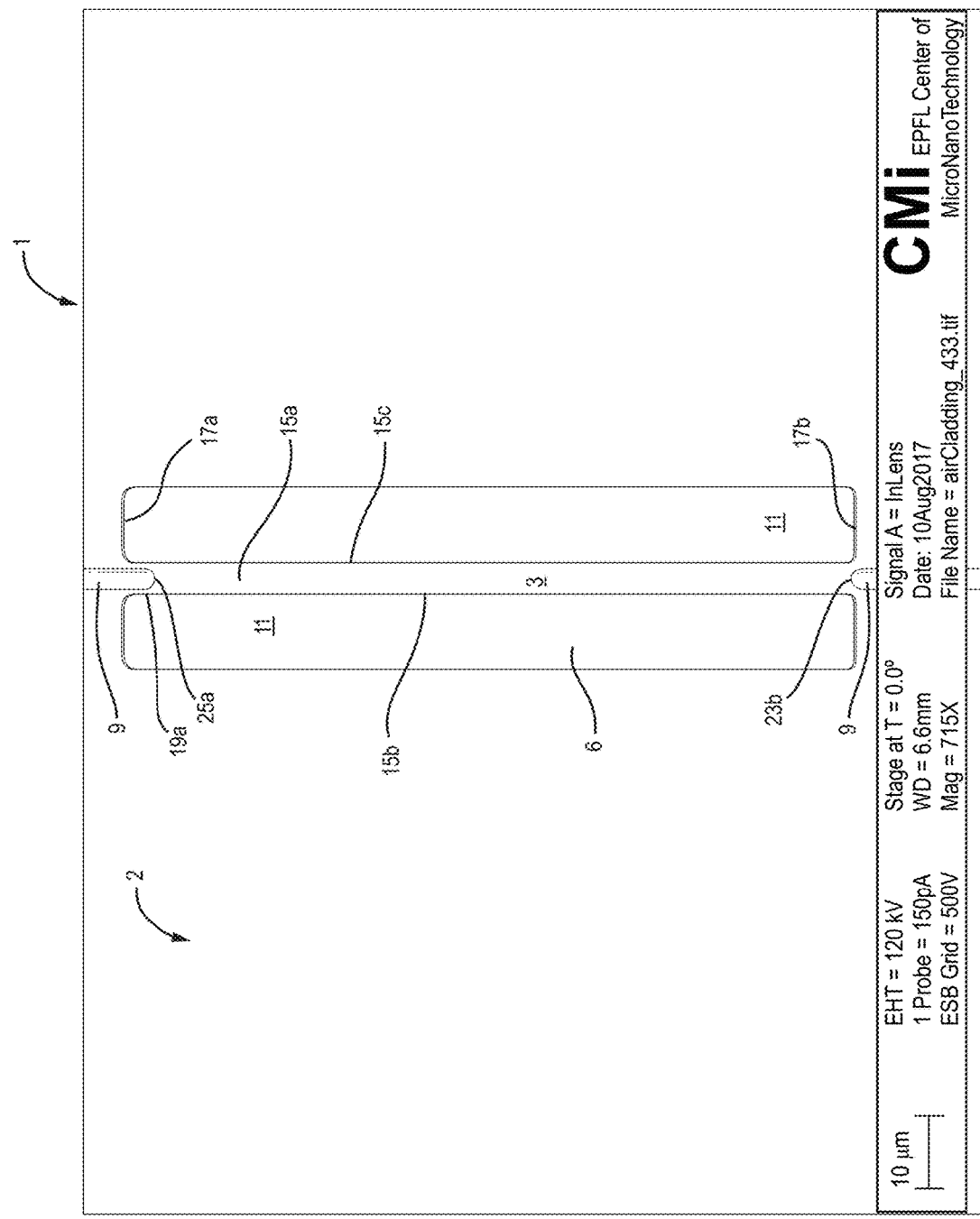
FIG. 10 shows a SEM image of a fabricated optical coupling device according to the present disclosure.
Figure 11:
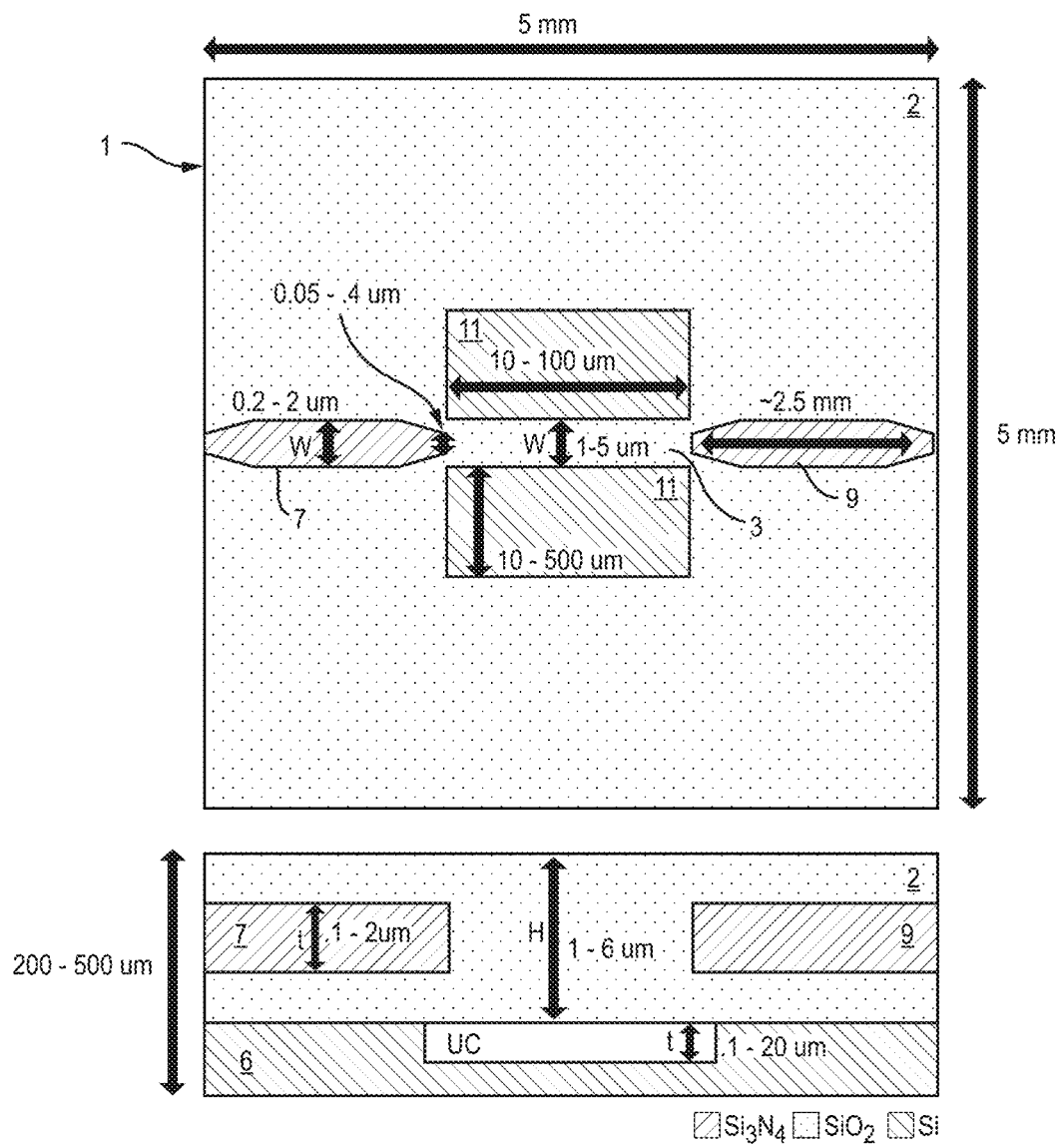
FIG. 11 shows exemplary dimensions and exemplary materials of the elements of the optical coupling device or photonic chip of the present disclosure.
Figure 12A:
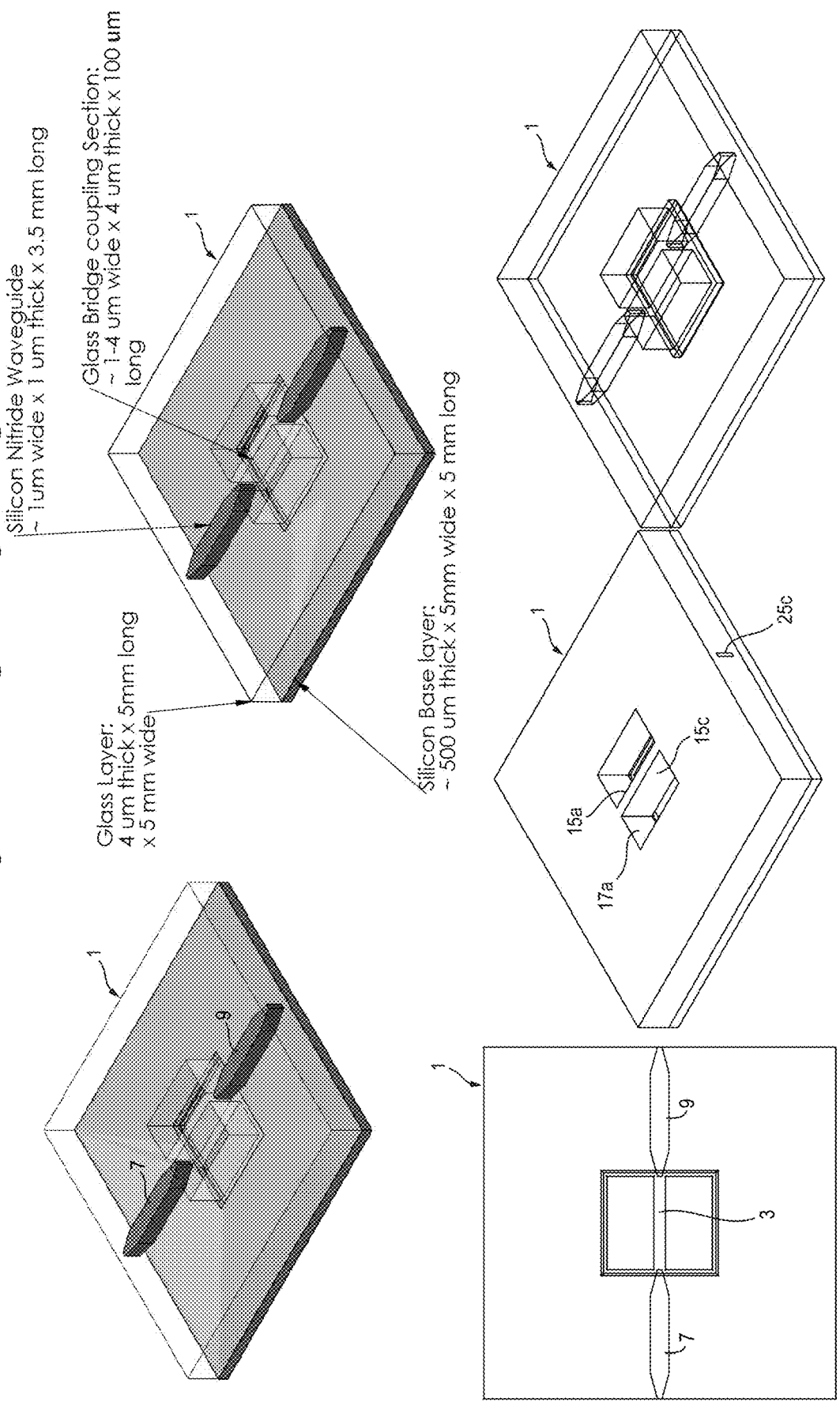
FIGS. 12A and 12B shows an exemplary embodiment of an optical coupling device according to the present disclosure. The materials and dimensions indicated in these Figures are non-limiting and solely provided as examples of possible materials and dimensions.
Figure 12B:
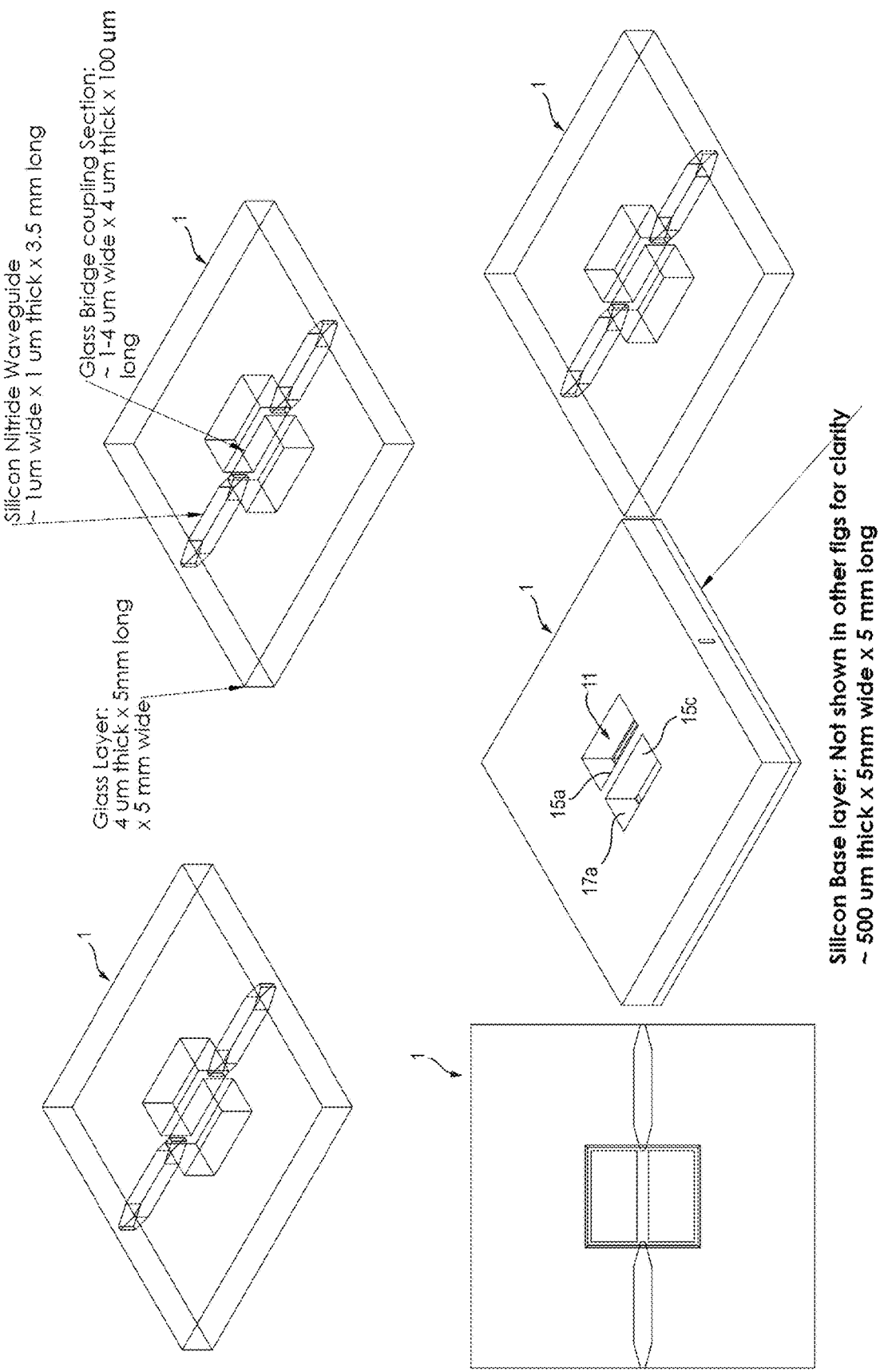
Figure 13A:
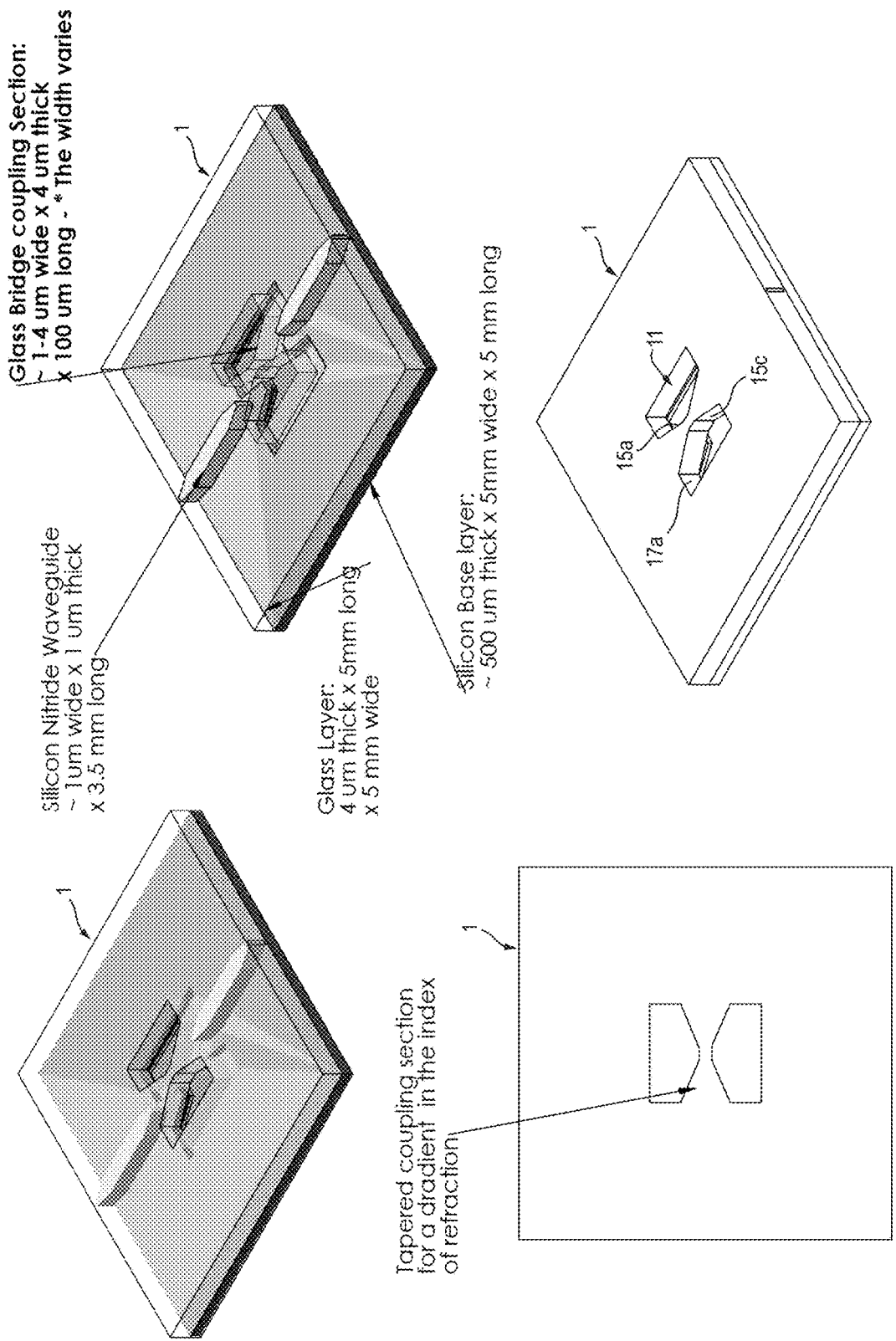
FIGS. 13A and 13B shows another exemplary embodiment of an optical coupling device according to the present disclosure. The materials and dimensions indicated in these Figures are non-limiting and solely provided as examples of possible materials and dimensions.
Figure 13B:
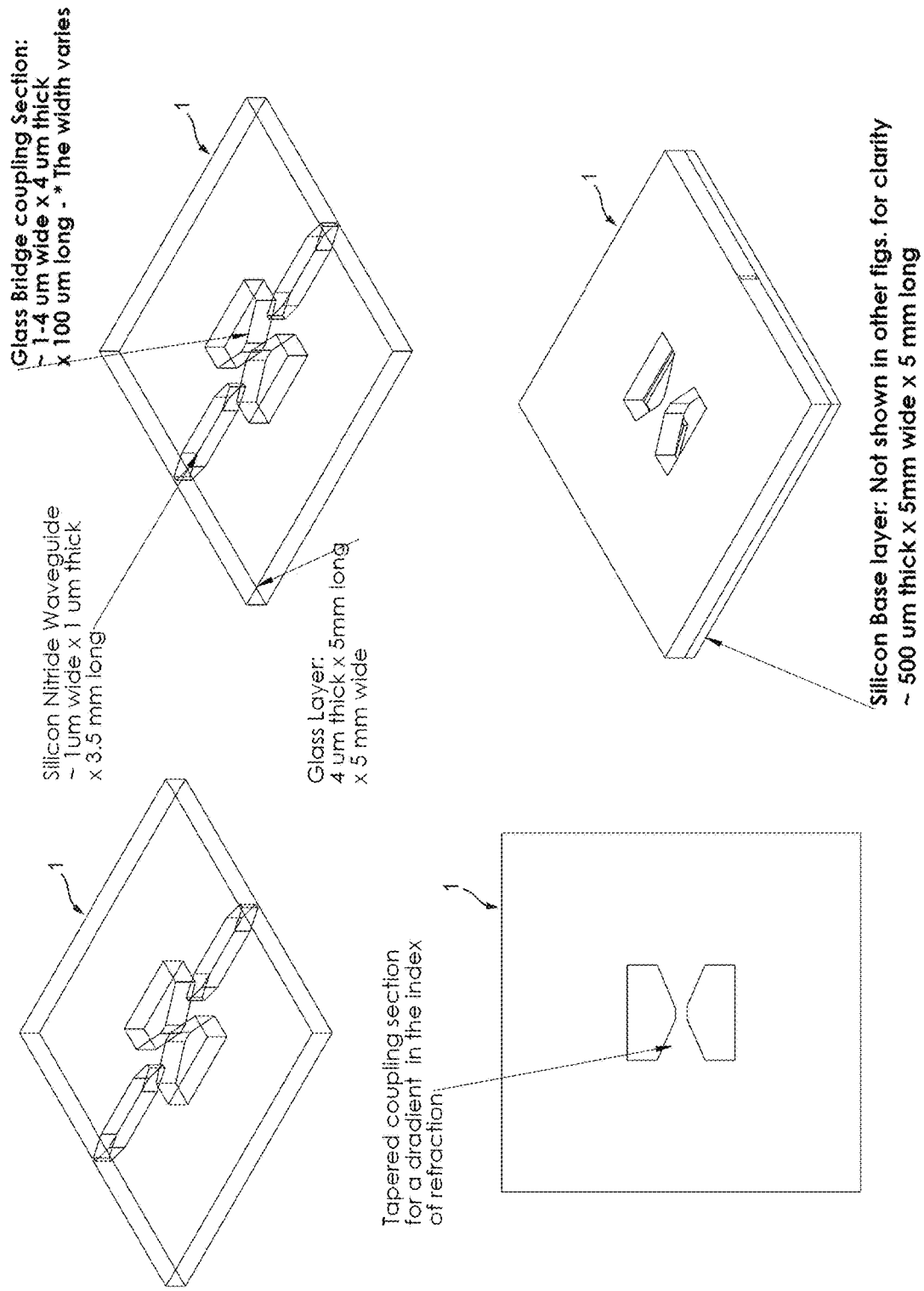
Figure 14A:
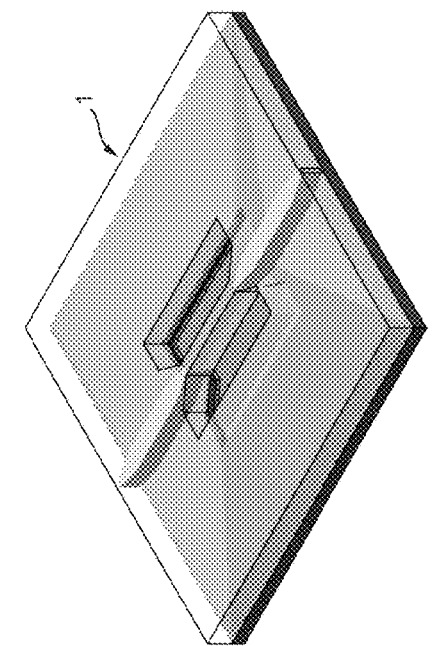
FIGS. 14A and 14B shows another exemplary embodiment of an optical coupling device according to the present disclosure. The materials and dimensions indicated in these Figures are non-limiting and solely provided as examples of possible materials and dimensions.
Figure 14A:
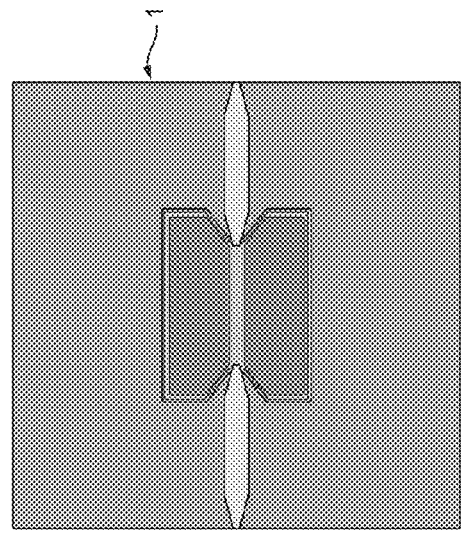
Figure 14A:
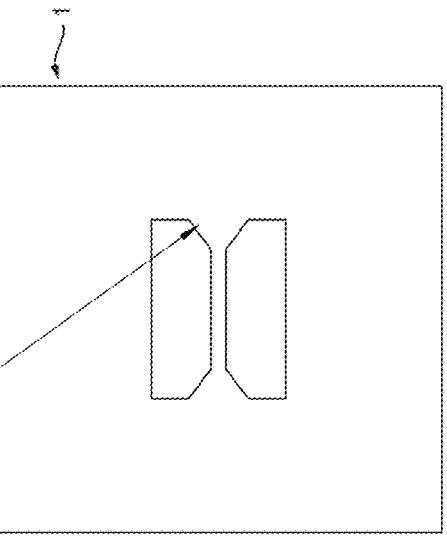
Figure 14B:
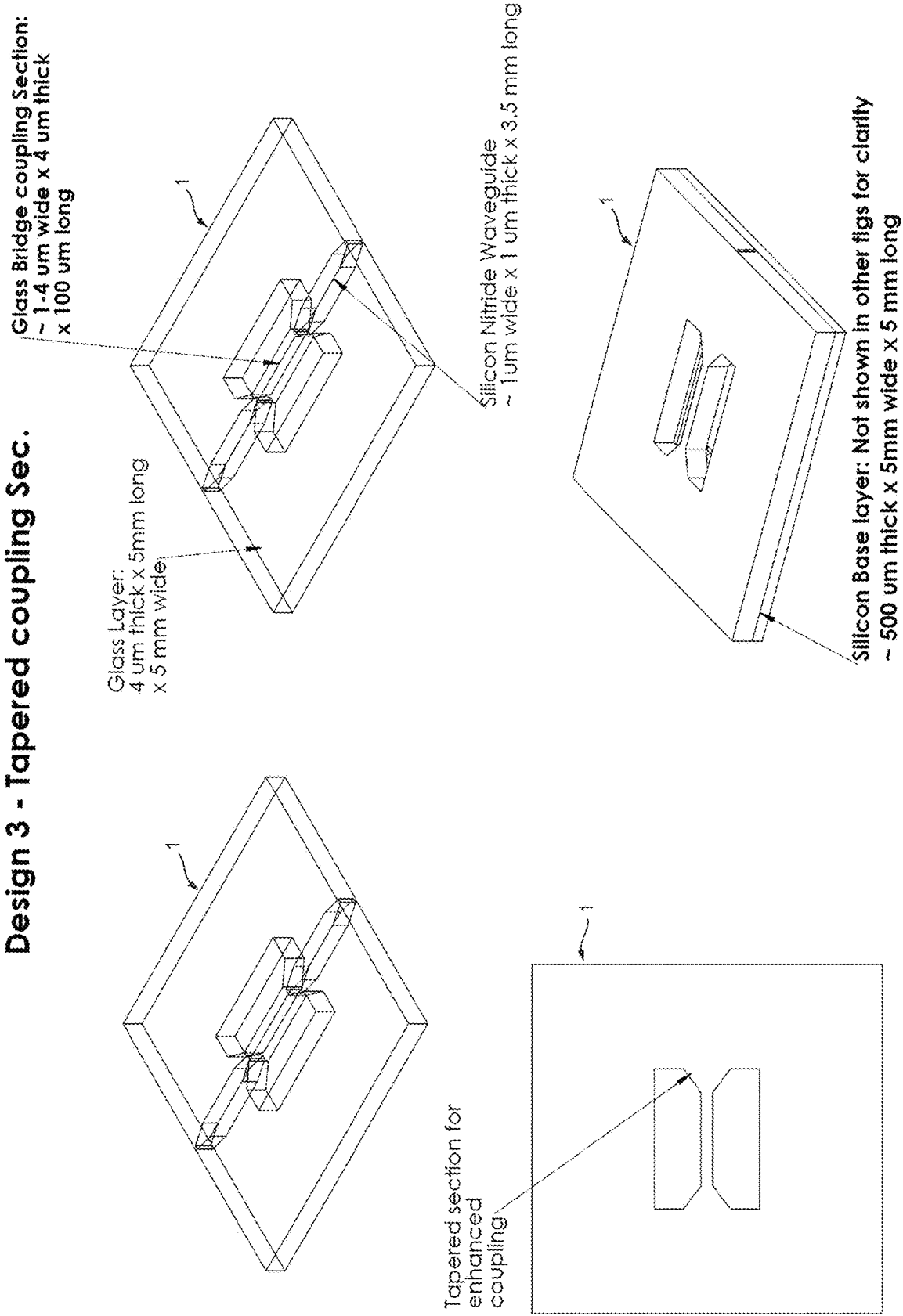

FIG. 1 shows a schematic image of the optical coupling device of design 1 and FIG. 10 shows a SEM image of the optical coupling device. For example, a silicon nitride waveguide 7, 9 couples into a fused silica beam 3 of a fixed rectangular cross section.

Figure 9A:
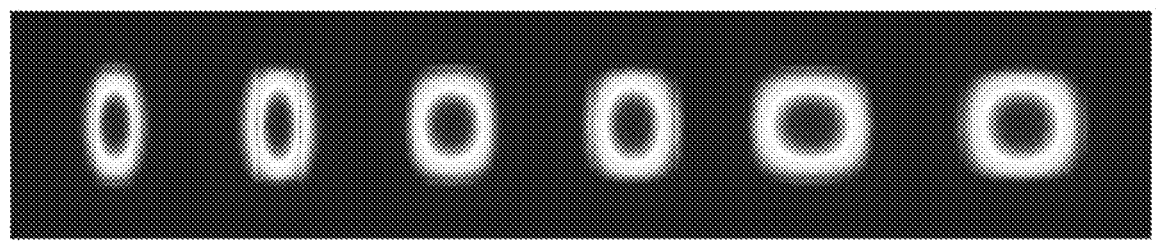
FIG. 9A shows optical modes for range of beam profiles.
Figure 9B:
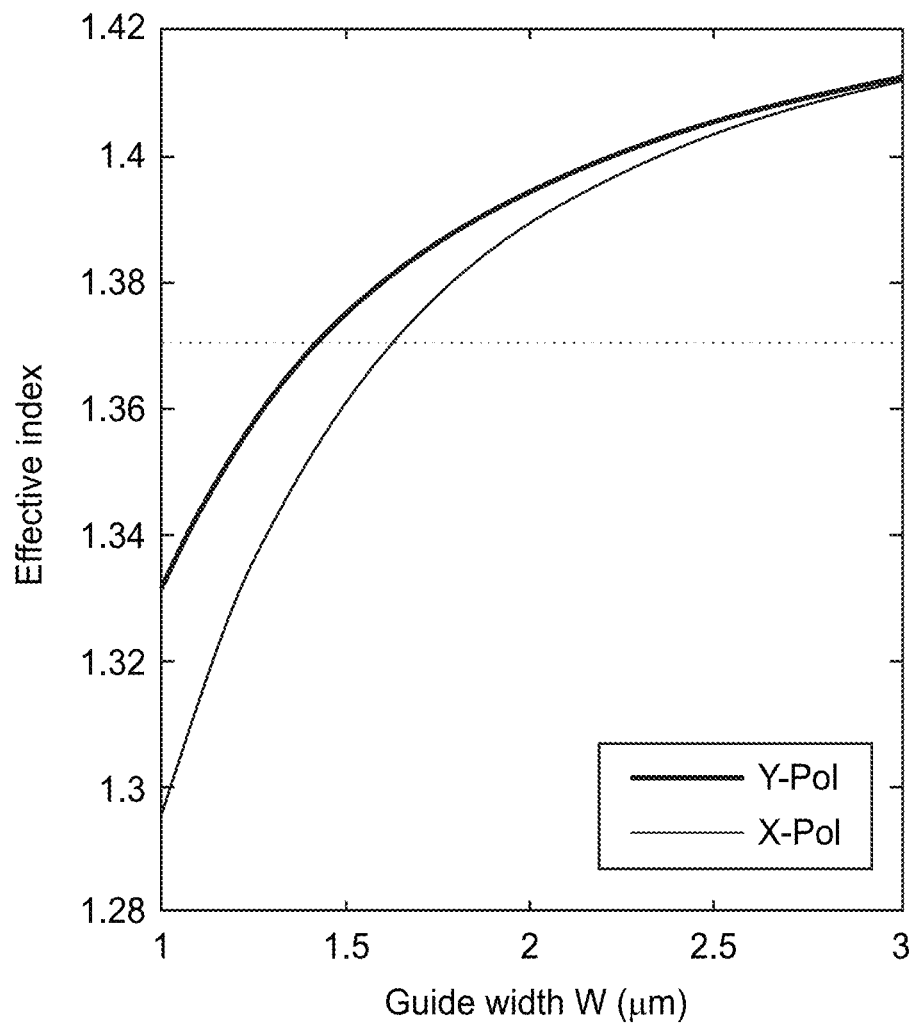
FIG. 9b shows the simulated effective index of refraction at 1550 nm for a $SiO_2$ beam with a height of 4 µm and a varying width, the straight line denotes the index of refraction for $MgF_2$.

In this design, the thickness t is fixed (4 µm) but the width W can be varied. As the width W is varied the effective index of refraction changes. FIG. 9B shows a simulated effective index of refraction as a function of the beam width W for a fixed 4 µm thickness t. FIG. 9B shows the simulated effective index of refraction at 1550 nm for a $SiO_2$ beam with a height or thickness of 4 µm and a varying width. The straight line denotes the index of refraction for $MgF_2$.

Design 2 provides a tapered index of refraction on a chip. This is accomplished by varying linearly varying the width W of the beam 3. This creates a linearly varying effective index of refraction.

In Design 3 the focus is on optimizing light coupling into the bridge. In design 1 there is more of an abrupt change in the index of refraction that the propagating modes see. In order to maximize the coupling, the material (for example, glass) around the tapered part 23b, 25a of the input and output optical waveguides 7,9 is also tapered.

The present disclosure also concerns a system including the optical coupling device 1 and at least one optical resonator 5. The optical resonator 5 can be any one of those previous mentioned, for example, a crystalline microresonator.

The fabrication process creates an isolated bridge like structure 3 on, for example, a photonic chip as described above. The bridge structure 3 is supported on two ends and is preferably surrounded by air, vacuum, or a lower index material on all sides. Other types of materials may be located below the bridge structure 3 such as Silicon.

The most convenient way to couple light to and from the bridge structure 3 is with optical waveguides 7, 9, however, these are not essential, and coupling can be free-space coupling using free-space optics.

There are several possible ways to implement the device 1 of the present disclosure. In the present disclosure, a "Subtractive" fabrication process was used to create silicon nitride waveguides 7, 9 that are buried in a fused silica layer ($SiO_2$) 2 of the photonic chip [43] [44]. This fused silica layer ($SiO_2$) 2 sits on top of a silicon layer or substrate 6. The waveguides 7, 9 are defined such as to couple light into and out of the bridge section 3. The waveguide material may comprise or consist solely of, for example, silicon nitride, or silicon, or aluminium nitride or lithium niobate.

The bridge section 3 is defined, for example, by one or more trenches 11 that are patterned using photolithography, followed by the first dry etching to remove the local $SiO_2$ layer using carbon fluoride as the main etchant (e.g. $C_4F_8$, $CF_4$). A second dry etching step using the Bosch Process [45], [46] removes the Si beneath 6 the $SiO_2$, thus creating suspended $SiO_2$ bridges. Any remaining Si under the bridge section can be further removed using $XeF_2$ etching, or Si wet etching based on KOH, or $HNO_3$+H F. Note that, the final wet etching to further remove the underlying Si can be necessary if the silicon undercut effect caused by the Bosch process does not work well, which can be affected by the $SiO_2$ bridging waveguide geometry.

Bridging Section Optimization

The size or dimensions of the bridging waveguide 3, forming the coupling section, is an important parameter to optimize the coupling. It is preferably be optimized and controlled in terms of the cross-section of the bridging waveguide 3. This enables efficient phase matching.

For example, for the specific of case alkaline earth fluoride optical microresonators 5, the preferred $SiO_2$ bridging waveguide 3 has a cross section, with widths W preferably between 1 to 10 µm and heights/thicknesses t between 1 to 10 µm.

The suspended $SiO_2$ bridging waveguide 3 is, for example, released from the underlying Si by $SiO_2$ and Si dry etching processes, which have an undercut effect in order to define the SiO₂ bridging waveguide 3, and to remove the Si beneath the SiO₂ bridge. These dry etching processes are important.

To etch through the SiO₂ layer, and to remove Si material beneath, the suspended SiO₂ bridge 3 needs to be protected from the etchants by the etch mask. Thus, the etch mask calculated has for example a minimum required height >8 μm, using standard UV lithography photoresist.

A thinner etch mask is possible but only with other material than UV photoresist, however, photoresist is readily available, easy to remove, and zero risk to contaminate the samples, thus it is preferred to use this.

However, it is well known that lithography resolution is proportional to 1/h, where h is the thickness of photoresist (8 um in our case). In short, making 1 μm features using 8 μm photoresist is very challenging, due to the achievable lithography resolution. To circumvent this limitation a larger than necessary bridging waveguide 3 is fabricated. The size of this this bridging waveguide 3 is compatible with the lithography resolution of the photoresist (typically a 2.8 μm feature size is possible with 8 μm of photoresist). Then, the SiO2 bridging section 3 is reduced in cross-sectional size (Typically the width W is reduced from 3 μm to 2 μm) by a buffer HF (BHF) etch [47]. The advantage is that, the BHF has slow etch rate (72 nm/min) and can be precisely calibrated before any action on the real samples. Therefore, combining lithography with BHF wet etch, the Inventors were able to attain SiO₂ bridging sections 3 whose size is below 2.8 μm in width W, which is not possible without BHF etch.

In addition to the well-controlled etch rate that allows very precise reduction in size of the SiO₂ bridging section 3, the isotropic nature of BHF wet etch can further smooth the SiO₂ bridging section surface roughness. This is important because as the waveguide becomes smaller, scattering caused by surface roughness becomes more significant, thus the BHF wet etch is important for maintaining low optical loss propagation in the bridging section 3.

The bridging waveguide 3 can thus be provided with a width less than (about) 4 μm and greater than 1 μm, for example, a width W less than 2.8 μm and greater than 1 μm.

Successful experiments have been carried out demonstrating the working of the design concept. The ability to couple to both Strontium Fluoride (SrF₂), Calcium Fluoride (CaF₂), Magnesium Fluoride (MgF₂), and Barium Fluoride (BaF₂) has been demonstrated as well as the ability to injection lock a distributed feedback lasers (DFB) at 1550 nm.

Coupling to Crystalline Resonators

The goal of the experiments was to demonstrate the coupling of the resonators 5 to the waveguide 3 and show the ideality of the waveguide coupling technique. The linewidth and coupling to the resonator 5 is monitored while the vertical distance of the resonator 5 to the waveguide 3 is varied.

To accomplish this the resonator 5 is first properly aligned to the waveguide 3 to maximize the coupling. The waveguide 3 can couple to multiple modes of the resonator 5, but the best coupled mode is found. In order to measure the coupling, the height of the resonator 5 is varied with ~100 nm steps. A Koheras fiber laser with a linewidth of ~100 kHz is coupled to the waveguide 3 and the frequency is swept across the resonance. The transmission of the waveguide 3 is recorded with a photodetector and oscilloscope. In order calibrate the frequency sweep, a phase modulator is used to create frequency side bands that are also swept across the resonance providing frequency markers for calibration. The basic experimental setup is shown in Error! Reference source not found.

Figure 4:
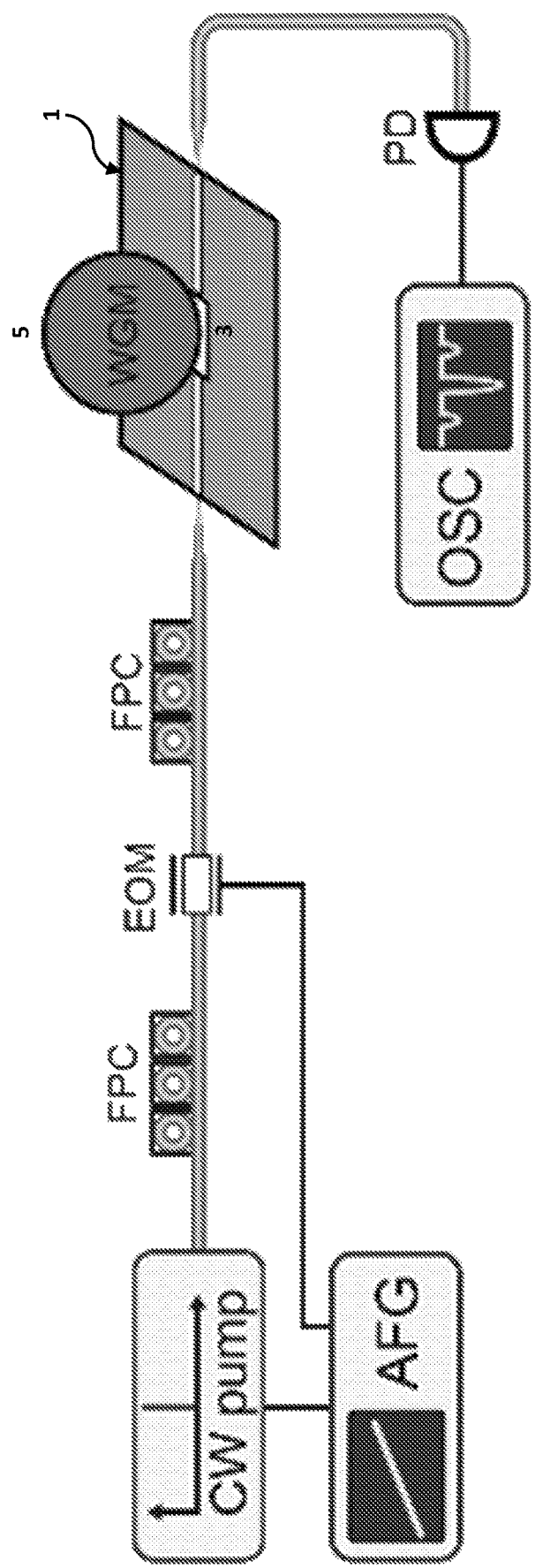
FIG. 4 shows an experimental setup in which a continuous wave (CW) pump laser's frequency is swept with an arbitrary function generator (AFG). An electro optic modulator (EOM) is used for phase modulation, providing the calibration sidebands. Two fiber polarization controllers are used to adjust the polarization going into the EOM and the microresonator. A photodiode (PD) and oscilloscope (OSC) monitor the transmitted light.

FIG. 4 shows an experimental setup in which a continuous wave (CW) pump laser's frequency is swept with an arbitrary function generator (AFG). An electro optic modulator (EOM) is used for phase modulation, providing the calibration sidebands. Two fiber polarization controllers are used to adjust the polarization going into the EOM and the microresonator. A photodiode (PD) and oscilloscope (OSC) monitor the transmitted light.

Two types of crystalline resonators 5 were tested SrF₂ and BaF₂. Both resonators 5 had large radii of curvature supporting many spatial modes. The tip, tilt, and position of the resonator 5 was optimized with respect to the wave guide 3 to optimize the coupling for the best coupled mode. In addition, the polarization of the coupling was adjusted to maximize the coupling. While sweeping the laser frequency as described above the height was varied in ~100 nm steps, which was the limit in the resolution of the nano-positioner. The zero height values was determined by observing when the input and output coupling of the resonator 5 started to vary, and thus it is only an approximate value. At each height the linewidth was measured.

| Material | Extinction % | Loaded Q | Minimum Linewidth kHz |
|---|---|---|---|
| SrF₂ | 84.4 | 1.5E8 | 350 |
| BaF₂ | 95.6 | 8.5E7 | 717 |

Figure 6:
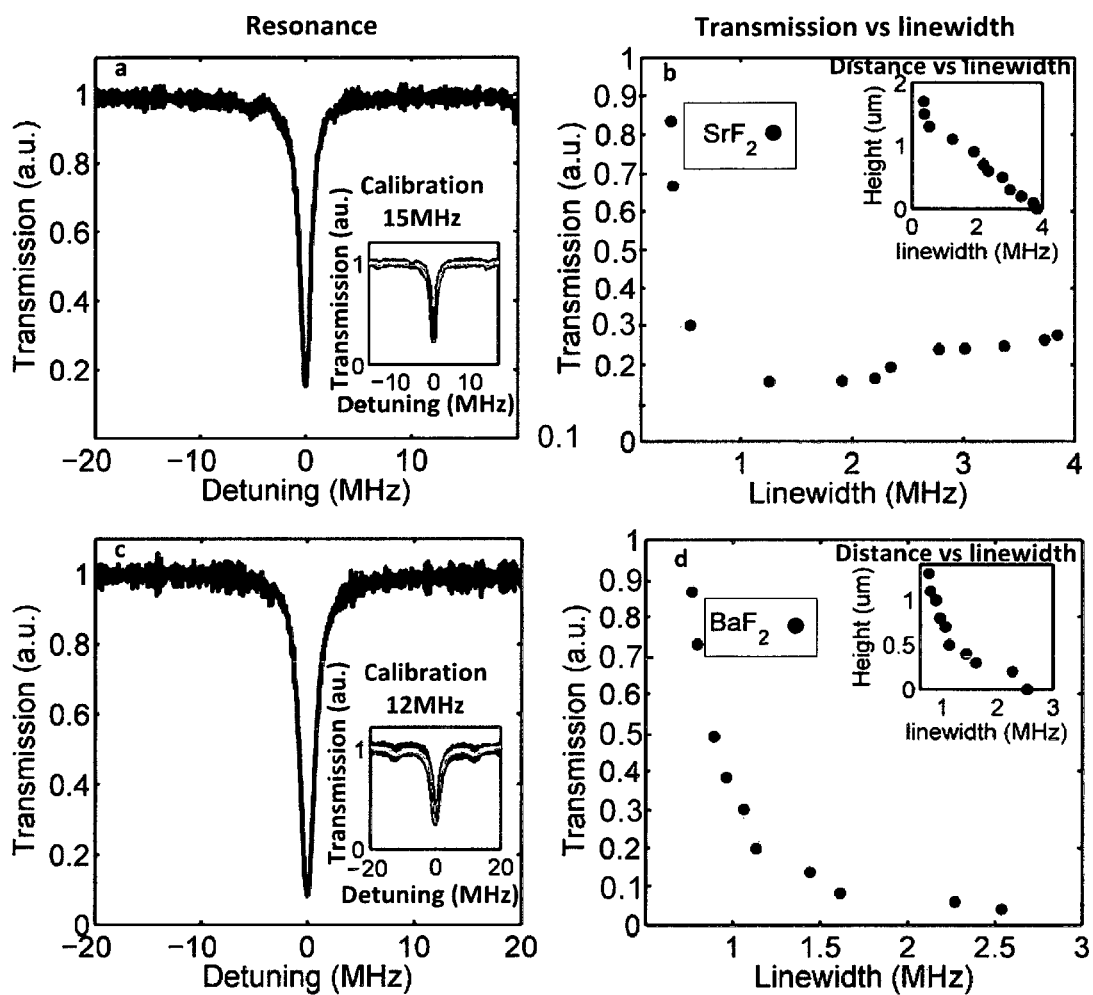
FIG. 6 shows measured results for the coupling of the $SrF_2$ and $BaF_2$ to photonic integrated chip.

FIG. 6 shows the experimental results. FIG. 6a and FIG. 6c show the transmission at near maximum coupling of each resonator 5, and the inset figure show calibration scans where phase modulator sidebands are applied. FIG. 6b and FIG. 6d show the transmission as a function of linewidth for each resonator 5, and the inset show the transmission plotted versus height for each point. The SrF₂ resonator 5 transmission versus height data shows near ideal behavior with an extinction of 84.4% and with a loaded quality factor of 1.5E8. The minimum linewidth measured when undercoupled was 350 kHz. Thus, the waveguide 3 allows for the coupling to be continuously varied from under to over coupled without significant loss to the substrate. Coupling BaF₂ resonator 5 shows an extinction of 95.6% at the maximal coupling with a loaded quality factor of 8.5E7, and minimum linewidth measured was 717 kHz. However, coupling with BaF₂ does not show the desired ideal behavior. This could result from the used waveguide 3 not having the right effective index of refraction, coupling to the substrate, or not been able to approach the waveguide 3 properly due to manufacturing defects.

Injection Locking of a DFB Laser

Having a packaged resonator with the coupling as demonstrated would enable the system to be used as a compact reference cavity enabling laser frequency stabilization via standard stabilization techniques such as Pound-Drever-Hall locking.

However, a promising route to laser frequency stabilization is via injection locking. When light is coupled to a high-quality factor optical resonator 5, a small portion of the light is back scattered via Rayleigh scattering. This light propagates backwards and can act as a seed for the laser, keeping the linewidth narrow. The company Oewaves has already successfully demonstrated the ability to create hertz level linewidths using diode lasers and crystalline resonators, using a prism coupling technique. The photonic chip technology 1 of this disclosure enables a more stable and reliable coupling technology.

Figure 5:
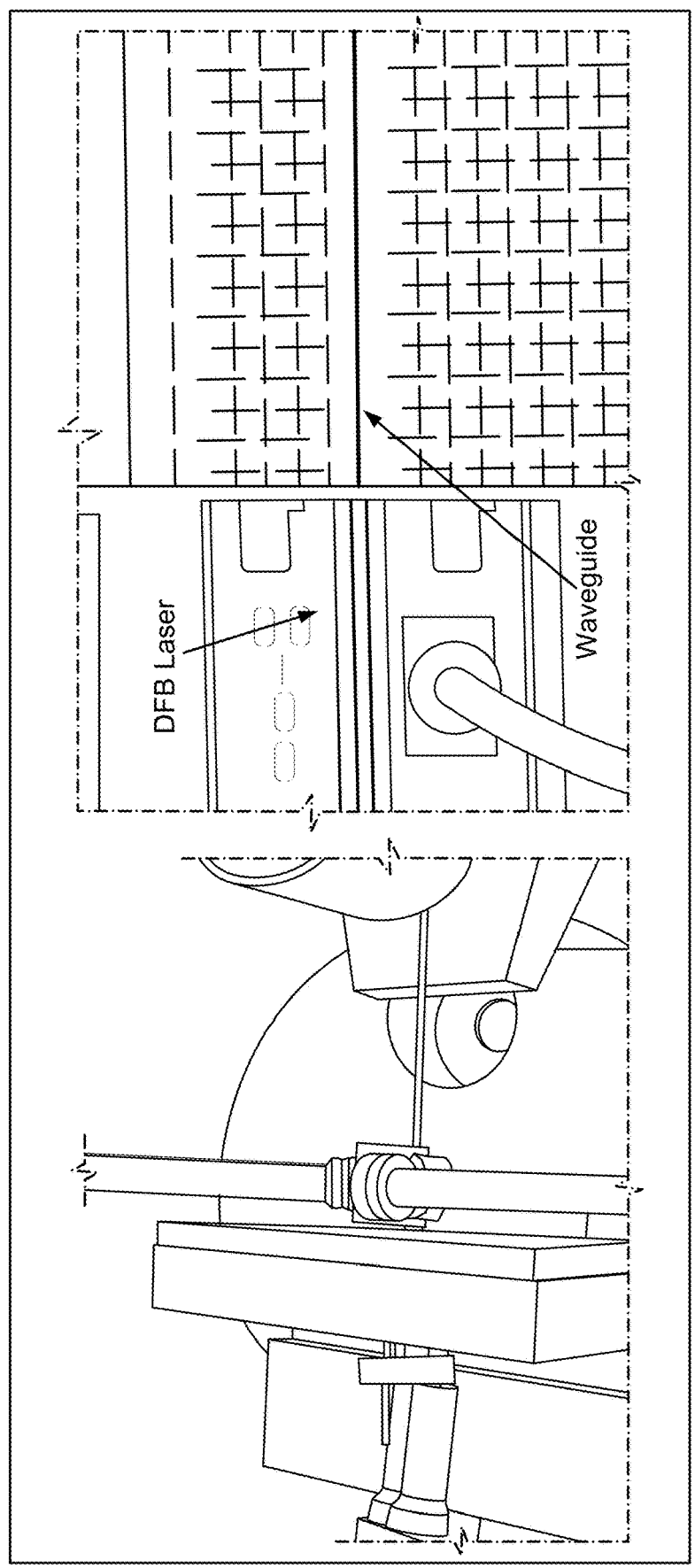
FIG. 5 shows injection locking of a laser diode. The left side of the figure shows a picture of the injection locking setup. The DFB laser is on the left and the crystalline resonator 5 can be seen centered over the photonic chip 1 and a lensed fiber can be seen on the right that serves to couple light out of the chip 1. The photo on the right shows a close up view of the waveguide 3 and the DFB laser.
Figure 7:
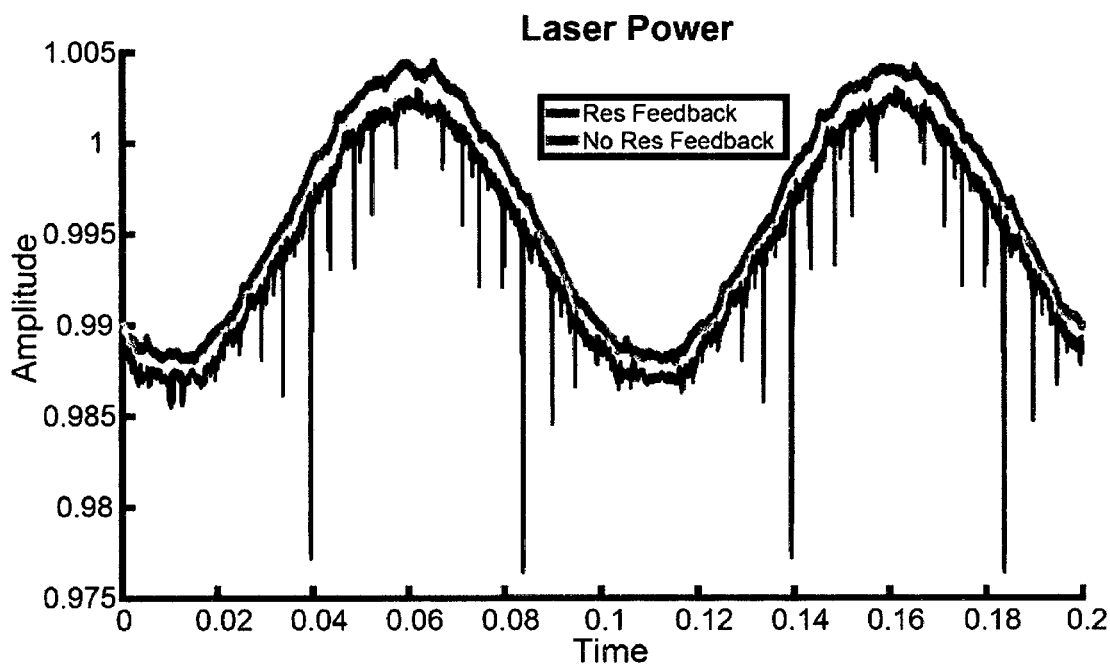
FIG. 7 shows measured results taken during injection locking of DFB laser to a crystalline resonator. The DFB laser is coupled to the optical waveguide and the laser frequency is scanned with a current sweep. The resulting power is monitored on the output of the waveguide. The resonator is coupled to the optical waveguide. The dips are where there is optical feedback to the DFB laser.

A diode laser can be directly butt coupled to the on chip optical waveguide 3. This can be accomplished independent of the resonator 5. FIG. 5 shows the coupling setup and a close up view of the semiconductor laser coupled to the waveguide 3. After the coupling is maximized the resonator 5 is coupled to waveguide 3 to provide optical feedback to the laser. To see the feedback, the current is ramped, changing both the power and the frequency of the laser. FIG. 7 shows the measured transmission with and without the resonator 5 coupled to the waveguide 3. When the laser is on resonance with the resonator 5 there is drop in the power, which is a signature of the feedback.

Figure 8:
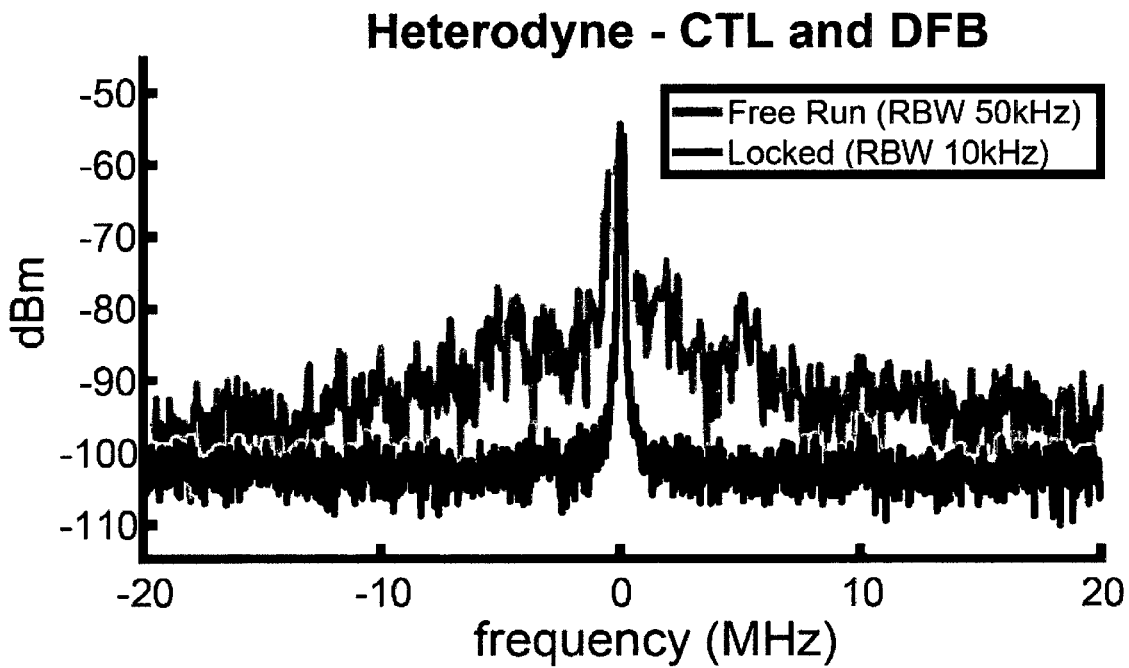
FIG. 8 shows an optical heterodyne beat signal between a DFB laser and a Toptica CTL laser. The first trace shows a best of beat between to the two free running lasers. The second trace shows the beat when the DFB laser injection locked and is heterodyned with the Toptica CTL laser.

To tune into one of the states, the frequency ramp is turned off and the current is tuned into until there is feedback to the laser. FIG. 8 shows the result of performing an optical heterodyne measurement between a Toptica CTL laser with a short-term line width of ~30 kHz and the injection locked DFB laser. The stated line width of the DFB laser is ~12 GHz. The free running beat of the of the DFB laser and the CTL laser is also shown. This was a best of signal. Typically, it was much broader than this and jumped around significantly.

Finally, it's important to specify that implementations described herein are not intended to limit the scope of the present disclosure but are just provided to illustrate possible realizations.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments and be given the broadest reasonable interpretation in accordance with the language of the appended claims. The features of any one of the above described embodiments may be included in any other embodiment described herein.

REFERENCES

[1] A. A. Savchenkov, A. B. Matsko, V. S. Ilchenko, and L. Maleki, "Optical resonators with ten million finesse," *Opt. Express*, vol. 15, p. 6768, 2007.

[2] V. B. Braginsky and V. S. Ilchenko, "No Title," *Sov. Phys. Dokl.*, vol. 32, pp. 306-307, 1987.

[3] T. J. Kippenberg, R. Holzwarth, and S. A. Diddams, "Microresonator-based optical frequency combs.," *Science (80-.).*, vol. 332, pp. 555-559, April 2011.

[4] M. Aspelmeyer, T. J. Kippenberg, and F. Marquardt, "Cavity optomechanics," *Rev. Mod. Phys.*, vol. 86, no. 4, pp. 1391-1452, December 2014.

[5] F. Vollmer and S. Arnold, "Whispering-gallery-mode biosensing: label-free detection down to single molecules," *Nat. Methods*, vol. 5, no. 7, pp. 591-596, July 2008.

[6] P. Del'Haye, A. Schliesser, O. Arcizet, T. Wilken, R. Holzwarth, and T. J. Kippenberg, "Optical frequency comb generation from a monolithic microresonator.," *Nature*, vol. 450, pp. 1214-7, December 2007.

[7] T. Herr, V. Brasch, J. D. Jost, C. Y. Wang, N. M. Kondratiev, M. L. Gorodetsky, and T. J. Kippenberg, "Temporal solitons in optical microresonators," *Nat. Photonics*, vol. 8, pp. 145-152, December 2013.

[8] P. Marin-Palomo, J. N. Kemal, M. Karpov, A. Kordts, J. Pfeifle, M. H. P. Pfeiffer, P. Trocha, S. Wolf, V. Brasch, M. H. Anderson, R. Rosenberger, K. Vijayan, W. Freude, T. J. Kippenberg, and C. Koos, "Microresonator-based solitons for massively parallel coherent optical communications," 2017.

[9] X. Xue, Y. Xuan, Y. Liu, P.-H. Wang, S. Chen, J. Wang, D. E. Leaird, M. Qi, and A. M. Weiner, "Mode-locked dark pulse Kerr combs in normal-dispersion microresonators," *Nat. Photonics*, vol. 9, no. 9, p. nphoton.2015.137, August 2015.

[10] W. Liang, D. Eliyahu, V. S. Ilchenko, a a Savchenkov, a B. Matsko, D. Seidel, and L. Maleki, "High spectral purity Kerr frequency comb radio frequency photonic oscillator.," *Nat. Commun.*, vol. 6, p. 7957, 2015.

[11] M.-G. Suh and K. Vahala, "Soliton Microcomb Range Measurement," arXiv:1705.06697 [physics], May 2017.

[12] S. B. Papp, K. Beha, P. Del'Haye, F. Quinlan, H. Lee, K. J. Vahala, and S. A. Diddams, "Microresonator frequency comb optical clock," *Optica*, vol. 1, no. 1, pp. 10-14, July 2014.

[13] V. Brasch, M. Geiselmann, T. Herr, G. Lihachev, M. H. P. Pfeiffer, M. L. Gorodetsky, and T. J. Kippenberg, "Photonic chip-based optical frequency comb using soliton Cherenkov radiation," *Science (80-.).*, vol. 351, no. 6271, p. 357, January 2016.

[14] J. D. Jost, T. Herr, C. Lecaplain, V. B. Brasch, M. H. P. Pfeiffer, and T. J. Kippenberg, "Counting the cycles of light using a self-referenced optical microresonator," *Optica*, vol. 2, no. 8, pp. 706-711, 2015.

[15] P. Del'Haye, A. Coillet, T. Fortier, K. Beha, D. C. Cole, K. Y. Yang, H. Lee, K. J. Vahala, S. B. Papp, and S. A. Diddams, "Phase-coherent microwave-to-optical link with a self-referenced microcomb," *Nat. Photonics*, vol. 10, no. 8, p. nphoton.2016.105, June 2016.

[16] V. Brasch, E. Lucas, J. D. Jost, M. Geiselmann, and T. J. Kippenberg, "Self-referenced photonic chip soliton Kerr frequency comb," *Light Sci. Appl.*, vol. 6, no. 1, p. e16202, January 2017.

[17] A. A. Savchenkov, A. B. Matsko, V. S. Ilchenko, I. Solomatine, D. Seidel, and L. Maleki, "Tunable optical frequency comb with a crystalline whispering gallery mode resonator," *Phys. Rev. Lett.*, vol. 101, p. 93902, 2008.

[18] M. A. Foster, J. S. Levy, O. Kuzucu, K. Saha, M. Lipson, and A. L. Gaeta, "Silicon-based monolithic optical frequency comb source," *Opt. Express*, vol. 19, no. 15, pp. 14233-14239, July 2011.

[19] J. S. Levy, A. Gondarenko, M. A. Foster, A. C. Turner-Foster, A. L. Gaeta, and M. Lipson, "CMOS-compatible multiple-wavelength oscillator for on-chip optical interconnects," *Nat. Photonics*, vol. 4, pp. 37-40, January 2010.

[20] H. Jung, C. Xiong, K. Y. Fong, X. Zhang, and H. X. Tang, "Optical frequency comb generation from aluminum nitride microring resonator," *Opt. Lett.*, vol. 38, no. 15, pp. 2810-2813, August 2013.

[21] M. Peccianti, A. Pasquazi, Y. Park, B. E. Little, S. T. Chu, D. J. Moss, and R. Morandotti, "Demonstration of a stable ultrafast laser based on a nonlinear microcavity," *Nat. Commun.*, vol. 3, p. 765, 2012.

[22] L. Razzari, D. Duchesne, M. Ferrera, R. Morandotti, S. Chu, B. E. Little, and D. J. Moss, "CMOS-compatible integrated optical hyper-parametric oscillator," *Nat. Photonics*, vol. 4, pp. 41-45, January 2010.

[23] B. J. M. Hausmann, I. Bulu, V. Venkataraman, P. Deotare, and M. Lončar, "Diamond nonlinear photonics," *Nat. Photonics*, vol. 8, pp. 369-374, April 2014.

[24] W. Liang, V. S. Ilchenko, A. A. Savchenkov, E. Dale, D. Eliyahu, A. B. Matsko, and L. Maleki, "Resonant microphotonic gyroscope," *Optica*, vol. 4, no. 1, p. 114, January 2017.

[25] W. Liang, V. S. Ilchenko, D. Eliyahu, A. A. Savchenkov, A. B. Matsko, D. Seidel, and L. Maleki, "Ultralow noise miniature external cavity semiconductor laser," *Nat. Commun.*, vol. 6, p. 7371, June 2015.

[26] J. Alnis, A. Schliesser, C. Y. Wang, J. Hofer, T. J. Kippenberg, and T. W. Hansch, "Thermal-noise-limited crystalline whispering-gallery-mode resonator for laser stabilization," *RAPID Commun. Phys. Rev. A*, vol. 84, 2011.

[27] M. L. Gorodetsky and V. S. Ilchenko, "Optical microsphere resonators: optimal coupling to high-Q whispering-gallery modes,"*J. Opt. Soc. Am. B*, vol. 16, no. 1, p. 147, January 1999.

[28] V. S. Ilchenko, X. S. Yao, and L. Maleki, "Pigtailing the high-Q microsphere cavity:?a simple fiber coupler for optical whispering-gallery modes," *Opt. Lett.*, vol. 24, no. 11, p. 723, June 1999.

[29] J. C. Knight, G. Cheung, F. Jacques, and T. A. Birks, "Phase-matched excitation of whispering-gallery-mode resonances by a fiber taper," *Opt. Lett.*, vol. 22, no. 15, pp. 1129-1131, 1997.

[30] D. Farnesi, F. Chiavaioli, G. C. Righini, S. Soria, C. Trono, P. Jorge, and G. N. Conti, "Long period grating-based fiber coupler to whispering gallery mode resonators," *Opt. Lett.*, vol. 39, no. 22, pp. 6525-6528, November 2014.

[31] Caltech, "Dual-wavelength hybrid waveguide coupler," U.S. Pat. No. 6,859,582 B2, 2000.

[32] Caltech, "Coupling system to a microsphere cavity," U.S. Pat. No. 6,389,197 B1, 1999.

[33] "Tapered optical waveguide device in semiconductor," U.S. Pat. No. 7,035,509 B2, 2002.

[34] "Evanescently coupling light between waveguides and whispering-gallery mode optical resonators," U.S. Pat. No. 7,283,707 B1, 2001.

[35] S. M. Spillane, T. J. Kippenberg, 0. J. Painter, and K. J. Vahala, "Ideality in a Fiber-Taper-Coupled Microresonator System for Application to Cavity Quantum Electrodynamics," *Phys. Rev. Lett.*, vol. 91, p. 43902, 2003.

[36] M. L. Gorodetsky and V. S. Ilchenko, "High-Q optical whispering-gallery microresonators: precession approach for spherical mode analysis and emission patterns with prism couplers," *Opt. Commun.*, vol. 113, pp. 133-143, 1994.

[37] A. Mazzei, S. Gotzinger, L. de S. Menezes, V. Sandoghdar, and O. Benson, "Optimization of prism coupling to high-Q modes in a microsphere resonator using a near-field probe," *Opt. Commun.*, vol. 250, no. 4, pp. 428-433, June 2005.

[38] Y.-L. Pan and R. K. Chang, "Highly efficient prism coupling to whispering gallery modes of a square µ cavity," *Appl. Phys. Lett.*, vol. 82, no. 4, pp. 487-489, January 2003.

[39] J.-P. Laine, B. E. Little, D. R. Lim, H. C. Tapalian, L. C. Kimerling, and H. A. Haus, "Microsphere resonator mode characterization by pedestal anti-resonant reflecting waveguide coupler," *IEEE Photonics Technol. Lett.*, vol. 12, no. 8, pp. 1004-1006, August 2000.

[40] K. Y. Yang, D. Y. Oh, S. H. Lee, Q.-F. Yang, X. Yi, and K. Vahala, "Bridging ultra-high-Q devices and photonic circuits," arXiv:1702.05076 [physics], February 2017.

[41] M. Soltani, V. Ilchenko, A. Matsko, A. Savchenkov, J. Schlafer, C. Ryan, and L. Maleki, "Ultrahigh Q whispering gallery mode electro-optic resonators on a silicon photonic chip," *Opt. Lett.*, vol. 41, no. 18, p. 4375, 2016.

[42] A. Savchenkov, H. Mahalingam, V. Ilchenko, S. Takahashi, A. Matsko, W. Steier, and L. Maleki, "Polymer Waveguide Couplers for Fluorite Microresonators," *IEEE Photonics Technol. Lett.*, pp. 1-1, 2017.

[43] Y. Xuan, Y. Liu, L. T. Varghese, A. J. Metcalf, X. Xue, P.-H. Wang, K. Han, J. A. Jaramillo-Villegas, A. Al Noman, C. Wang, S. Kim, M. Teng, Y. J. Lee, B. Niu, L. Fan, J. Wang, D. E. Leaird, A. M. Weiner, and M. Qi, "High-Q silicon nitride microresonators exhibiting low-power frequency comb initiation," *Optica*, vol. 3, no. 11, p. 1171, November 2016.

[44] A. Gondarenko, J. S. Levy, and M. Lipson, "High confinement micron-scale silicon nitride high Q ring resonator," *Opt. Express*, vol. 17, no. 14, pp. 11366-11370, July 2009.

[45] F. Laermer and A. Schilp, "Method of anisotropically etching silicon," U.S. Pat. No. 5,501,893A, 1992.

[46] F. Laermer and A. Schilp, "Process for anisotropic plasma etching of different substrates," U.S. Pat. No. 6,127,273A, 1996.

[47] K. Williams, K. Gupta, and M. Wasilik, "Etch rates for micromachining processing-Part II," *J. Microelectromechanical Syst.*, vol. 12, no. 6, pp. 761-778, 2003.

References, each one of which is herein fully incorporated by reference.

The invention claimed is:

1. Optical coupling device including:
   at least one supporting layer comprising a first support wall and a second support wall,
   wherein the at least one supporting layer comprises at least one bridging waveguide for coupling electromagnetic radiation to and from an optical resonator or optical device, the at least one bridging waveguide extending between the first support wall and the second support wall,
   wherein the at least one bridging waveguide and the at least one supporting layer comprise or consist solely of the same material,
   wherein the at least one bridging waveguide is directly in contact with only the first support wall and only the second support wall to extend between the first support wall and the second support wall,
   wherein the at least one bridging waveguide includes a center located between a first extremity and a second extremity, and the at least one bridging waveguide has a cross-sectional profile tapering outward in a direction running from the center of the bridging waveguide towards the first extremity and/or the second extremity of the bridging waveguide.

2. Optical coupling device according to claim 1, further including at least one recess or trench structure surrounding the at least one bridging waveguide.

3. Optical coupling device according to claim 2, wherein the first support wall and the second support wall hold the at least one bridging waveguide in suspension or over- hanging in the at least one recess or trench structure.

4. Optical coupling device according to claim 3, wherein the first support wall and the second support wall hold the at least one bridging waveguide in suspension or over-hanging in the at least one recess or trench structure, and the optical coupling device further includes a support base in contact with and supporting a floor of the at least one bridging waveguide.

5. Optical coupling device according to claim 1 further including:

at least one input optical waveguide; and at least one output optical waveguide;

the at least one bridging waveguide being located between the at least one input optical waveguide and the at least one output optical waveguide.

6. Optical coupling device according to claim 1, wherein the bridging waveguide is defined by the at least one recess or trench structure.

7. Optical coupling device according to claim 2, wherein the at least one recess or trench structure partially or fully surrounds the at least one bridging waveguide.

8. Optical coupling device according to claim 2, wherein the at least one recess or trench structure defines at least a first wall and a second wall of the at least one bridging waveguide.

9. Optical coupling device according to claim 2, wherein the at least one recess or trench structure further defines a floor of the at least one bridging waveguide.

10. Optical coupling device according to claim 2, wherein the at least one recess or trench structure includes a first trench defining a first wall of the at least one bridging waveguide and a second trench defining a second wall of the at least one bridging waveguide and at least one undercut extending from the first or second trench to define a floor of the at least one bridging waveguide.

11. Optical coupling device according to claim 10, wherein the at least one undercut extends fully from the first trench to the second trench to define the floor of the at least one bridging waveguide.

12. Optical coupling device according to claim 2, wherein the at least one recess or trench structure defines the at least one bridging waveguide that is rectangular or square in cross-section, and at least three sides of which are surrounded by air.

13. Optical coupling device according to claim 2, wherein the at least one recess or trench structure defines the at least one bridging waveguide that is circular or oval in cross-section.

14. Optical coupling device according to claim 2, wherein the at least one recess or trench structure is filled with a material having a lower or higher refractive index than that of a bridging waveguide material of the at least one bridging waveguide.

15. Optical coupling device according to claim 5, wherein the at least one bridging waveguide includes a straight section as well as first and second tapered sections, the straight section comprising straight or parallel side walls sandwiched between the first tapered section and the second tapered section, the first tapered section tapering inwards towards the straight section, and the second tapered section tapering outwards from the straight section, and wherein the first tapered section tapers inwards from the at least one input optical waveguide towards the straight section, and the second tapered section tapers outwards from the straight section to the at least one output optical waveguide, the at least one input optical waveguide directly contacting the first tapered section and the at least one output optical waveguide directly contacting the second tapered section.

16. Optical coupling device according to claim 5, wherein the at least one input optical waveguide and/or the at least one output optical waveguide comprise or consists solely of Silicon Nitride, or silicon, or aluminium nitride, or alumnia or lithium niobate.

17. Optical coupling device according to claim 1, wherein the at least one supporting layer comprise or consists solely of fused silica.

18. Optical coupling device according to claim 5, wherein the at least one input optical waveguide and/or the at least one output optical waveguide are integrated or enclosed by the bridging waveguide material.

19. Optical coupling device according to claim 9, wherein the at least one input optical waveguide and/or the at least one output optical waveguide include a tapered input end and a tapered output end.

20. Optical coupling device according to claim 19, wherein the tapered output end is enclosed by a first tapered end of the at least one bridging waveguide, and the tapered input end is enclosed by a second tapered end of the at least one bridging waveguide.

21. Optical coupling device according to claim 1, wherein that the at least one supporting layer comprises the first support wall and the second support wall inside the at least one supporting layer, and the at least one bridging waveguide extends inside the at least one supporting layer between the first support wall and the second support wall.

22. Optical coupling device according to claim 1, further including at least one input optical waveguide to couple electromagnetic radiation to the at least one bridging waveguide, the input optical waveguide being buried inside the supporting layer.

23. Optical coupling device according to claim 1, wherein the optical coupling device is an evanescent field coupling device.

* * * * *